(12) United States Patent
Lee et al.

(10) Patent No.: US 9,832,806 B2
(45) Date of Patent: Nov. 28, 2017

(54) METHOD FOR PROCESSING RADIO LINK FAILURE AND DEVICE THEREFOR

(71) Applicant: KT CORPORATION, Gyeonggi-do (KR)

(72) Inventors: KyungJun Lee, Seoul (KR); Sung-pyo Hong, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 132 days.

(21) Appl. No.: 14/781,356

(22) PCT Filed: Apr. 4, 2014

(86) PCT No.: PCT/KR2014/002902
§ 371 (c)(1),
(2) Date: Sep. 30, 2015

(87) PCT Pub. No.: WO2014/163419
PCT Pub. Date: Oct. 9, 2014

(65) Prior Publication Data
US 2016/0057802 A1    Feb. 25, 2016

(30) Foreign Application Priority Data

Apr. 4, 2013 (KR) .................. 10-2013-0036870
Oct. 30, 2013 (KR) .................. 10-2013-0130502
Dec. 23, 2013 (KR) .................. 10-2013-0161241

(51) Int. Cl.
*H04W 4/00* (2009.01)
*H04W 76/02* (2009.01)

(52) U.S. Cl.
CPC ....... *H04W 76/028* (2013.01); *H04W 76/025* (2013.01)

(58) Field of Classification Search
None
See application file for complete search history.

(56) References Cited

U.S. PATENT DOCUMENTS

2010/0238799 A1* 9/2010 Sebire ............... H04M 15/8038
370/225
2011/0250892 A1  10/2011 Gupta et al.
(Continued)

FOREIGN PATENT DOCUMENTS

| KR | 10-2010-0048497 A | 5/2010 |
|---|---|---|
| KR | 10-2012-0121692 A | 11/2012 |
| WO | 2013/009892 A1 | 1/2013 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0 (Mar. 2013), pp. 1-344.

(Continued)

*Primary Examiner* — Phirin Sam
(74) *Attorney, Agent, or Firm* — IP Legal Services, LLC

(57) ABSTRACT

A method may be provided for processing a radio link failure (RLF) when a terminal accesses at least two cells from different base stations. The method may include configuring a dual connection of at least one cell associated with a first bases station and at least one cell associated with a second base station, detecting the occurrence of an RLF of at least one cell from the at least one cell associated with the first base station and/or the at least one cell associated with the second base station, transmitting a signal related to the RLF to the first base station or second base station, and receiving setting information for processing the RLF.

15 Claims, 17 Drawing Sheets

(56) References Cited

U.S. PATENT DOCUMENTS

| | | |
|---|---|---|
| 2012/0276897 A1 | 11/2012 | Kwon et al. |
| 2012/0281548 A1 | 11/2012 | Lin et al. |
| 2012/0327908 A1 | 12/2012 | Gupta et al. |
| 2014/0219248 A1 | 8/2014 | Reddiboyana et al. |
| 2014/0233396 A1* | 8/2014 | Marinier ............... H04W 72/02 370/242 |
| 2014/0369201 A1* | 12/2014 | Gupta ............... H04W 28/0215 370/235 |
| 2015/0365872 A1* | 12/2015 | Dudda .............. H04W 36/0055 455/436 |
| 2017/0048736 A1* | 2/2017 | Marinier ............... H04W 72/02 |

OTHER PUBLICATIONS

NTT Docomo, Inc., "Necessity of C-plane architecture enhancements for dual connectivity", R2-130488, 3GPP TSG-RAN2# 81, St. Julian's, Malta, Jan. 28-Feb. 1, 2013, pp. 1-4.

* cited by examiner

FIG.3

```
-- ASN1START

RRCConnectionReestablishmentRequest ::= SEQUENCE {
    criticalExtensions          CHOICE {
        rrcConnectionReestablishmentRequest-r8
                                    RRCConnectionReestablishmentRequest-r8-IEs,
        criticalExtensionsFuture    SEQUENCE {}
    }
}

RRCConnectionReestablishmentRequest-r8-IEs ::= SEQUENCE {
    ue-Identity                 ReestabUE-Identity,
    reestablishmentCause        ReestablishmentCause,
    spare                       BIT STRING (SIZE (2))
}

ReestabUE-Identity ::=          SEQUENCE {
    c-RNTI                      C-RNTI,
    physCellId                  PhysCellId,
    shortMAC-I                  ShortMAC-I
}

ReestablishmentCause ::=        ENUMERATED {                    SeNBFailure
                                    reconfigurationFailure, handoverFailure,
                                    otherFailure, SCellFailure}

-- ASN1STOP
```

FIG.4

```
-- ASN1START

RRCConnectionReestablishmentRequest ::= SEQUENCE {
    criticalExtensions              CHOICE {
        rrcConnectionReestablishmentRequest-r8
                                    RRCConnectionReestablishmentRequest-r8-IEs,
        criticalExtensionsFuture    SEQUENCE {}
    }
}

RRCConnectionReestablishmentRequest-r8-IEs ::= SEQUENCE {
    ue-Identity                     ReestabUE-Identity,
    reestablishmentCause            ReestablishmentCause,
    nonCriticalExtension            RRCConnectionReestablishmentRequest -v12xx-IEs    OPTIONAL
}

RRCConnectionReestablishmentRequest-r12xx-IEs ::= SEQUENCE {
    SCellFailure-r12                ServCellIndex-r10,
    nonCriticalExtension            SEQUENCE {}                  OPTIONAL    -- Need OP
}

ReestabUE-Identity ::=              SEQUENCE {
    c-RNTI                          C-RNTI,
    physCellId                      PhysCellId,
    shortMAC-I                      ShortMAC-I
}

ReestablishmentCause ::=            ENUMERATED {
                                    reconfigurationFailure, handoverFailure,
                                    otherFailure, spare1}

-- ASN1STOP
```

FIG.5

```
SCellToAddModList-r10  ::=    SEQUENCE (SIZE (1..maxSCell-r10)) OF SCellToAddMod-r10

SCellToAddMod-r10  ::=    SEQUENCE {
    sCellIndex-r10                            SCellIndex-r10,
    cellIdentification-r10                    SEQUENCE {
        physCellId-r10                            PhysCellId,
        dl-CarrierFreq-r10                        ARFCN-ValueEUTRA
    }                                                                OPTIONAL,  -- Cond SCellAdd
    radioResourceConfigCommonSCell-r10        RadioResourceConfigCommonSCell-r10    OPTIONAL,  -- Cond SCellAdd
    radioResourceConfigDedicatedSCell-r10     RadioResourceConfigDedicatedSCell-r10 OPTIONAL,  -- Cond SCellAdd2
    ...
}

SCellToReleaseList-r10  ::=   SEQUENCE (SIZE (1..maxSCell-r10)) OF SCellIndex-r10
```

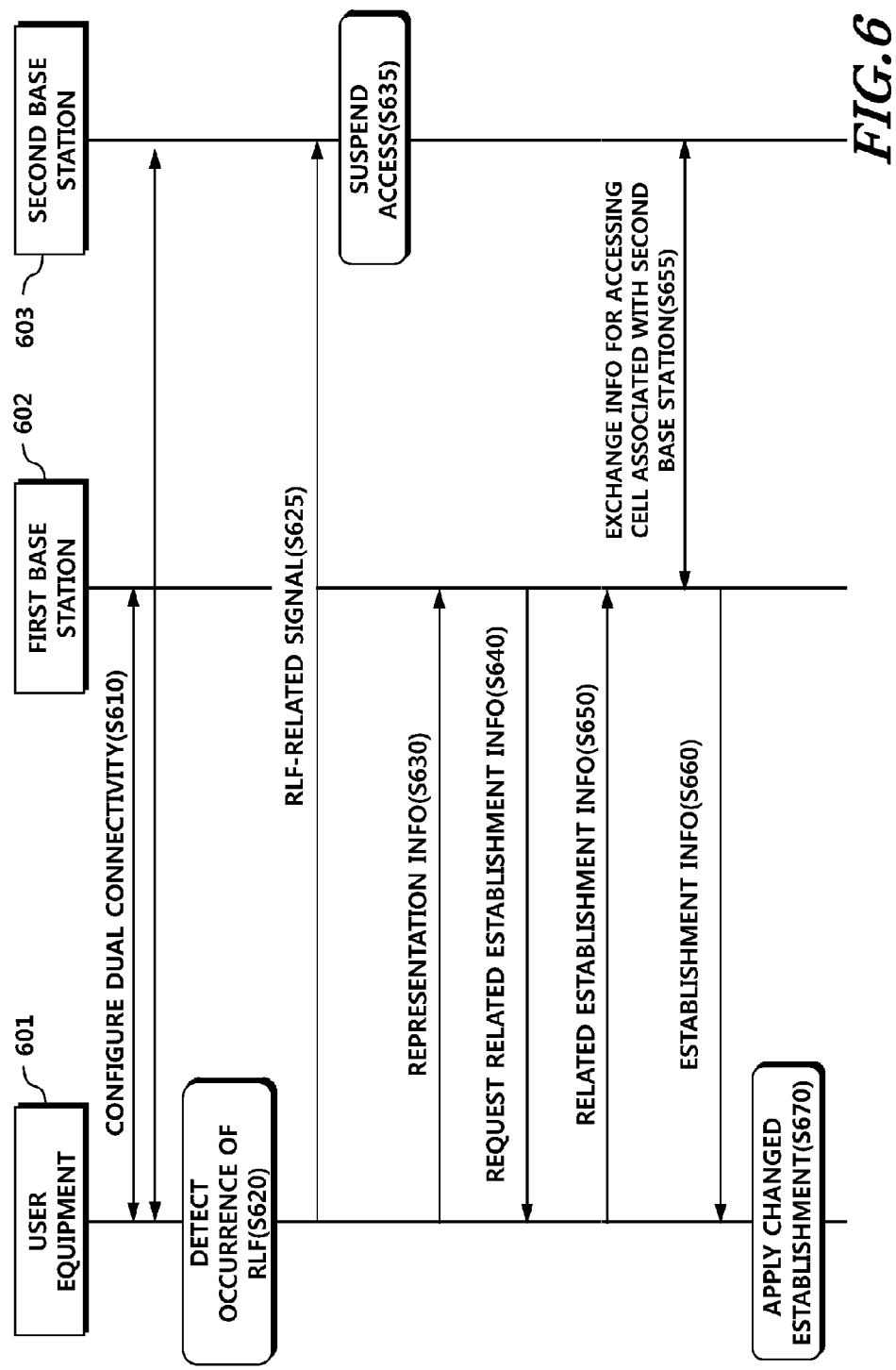

FIG. 7

```
-- ASN1START

RRCConnectionReestablishmentComplete ::=   SEQUENCE {
    rrc-TransactionIdentifier               RRC-TransactionIdentifier,
    criticalExtensions                      CHOICE {
        rrcConnectionReestablishmentComplete-r8
                                            RRCConnectionReestablishmentComplete-r8-IEs,
        criticalExtensionsFuture            SEQUENCE {}
    }
}

RRCConnectionReestablishmentComplete-r8-IEs ::= SEQUENCE {
    nonCriticalExtension                    RRCConnectionReestablishmentComplete-v920-IEs    OPTIONAL
}

RRCConnectionReestablishmentComplete-v920-IEs ::= SEQUENCE {
    rlf-InfoAvailable-r9                    ENUMERATED {true}                                OPTIONAL,
    nonCriticalExtension                    RRCConnectionReestablishmentComplete-v8a0-IEs    OPTIONAL
}

RRCConnectionReestablishmentComplete-v8a0-IEs ::= SEQUENCE {
    lateNonCriticalExtension                OCTET STRING                                     OPTIONAL,
    nonCriticalExtension                    RRCConnectionReestablishmentComplete-v1020-IEs   OPTIONAL
}

RRCConnectionReestablishmentComplete-v1020-IEs ::= SEQUENCE {
    logMeasAvailable-r10                    ENUMERATED {true}                                OPTIONAL,
    nonCriticalExtension                    RRCConnectionReestablishmentComplete-v11x0-IEs   OPTIONAL
}

RRCConnectionReestablishmentComplete-v11x0-IEs ::= SEQUENCE {
    connEstFailInfoAvailable-r11            ENUMERATED {true}                                OPTIONAL,
    nonCriticalExtension                    RRCConnectionReestablishmentComplete-v12x0-IEs   OPTIONAL
}

RRCConnectionReestablishmentComplete-v12x0-IEs ::= SEQUENCE {
    sCellInfoAvailable-r12                  ENUMERATED {true}                                OPTIONAL
    nonCriticalExtension                    SEQUENCE {}                                      OPTIONAL
}

-- ASN1STOP
```

FIG.8

```
sCellToAddModList-r10 ::=        SEQUENCE (SIZE (1..maxSCell-r10)) OF SCellToAddMod-r10

SCellToAddMod-r10 ::=     SEQUENCE {
    sCellIndex-r10                  sCellIndex-r10,
    cellIdentification-r10          SEQUENCE {
        physCellId-r10                  PhysCellId,
        dl-CarrierFreq-r10              ARFCN-ValueEUTRA
    }                                                                 OPTIONAL,   -- Cond SCellAdd
    radioResourceConfigCommonSCell-r10      RadioResourceConfigCommonSCell-r10 OPTIONAL,  -- Cond SCellAdd
    radioResourceConfigDedicatedSCell-r10   RadioResourceConfigDedicatedSCell-r10 OPTIONAL, -- Cond
SCellAdd2
...
}

SCellToReleaseList-r10 ::=       SEQUENCE (SIZE (1..maxSCell-r10)) OF SCellIndex-r10
```

METHOD FOR PROCESSING RADIO LINK FAILURE AND DEVICE THEREFOR

CROSS REFERENCE TO RELATED APPLICATIONS

This application is a National Stage Patent Application of PCT International Patent Application No. PCT/KR2014/002902 (filed on Apr. 4, 2014) under 35 U.S.C. §371, which claims priority to Korean Patent Application Nos. 10-2013-0036870 (filed on Apr. 4, 2013), 10-2013-0130502 (filed on Oct. 30, 2013), and 10-2013-0161241 (filed on Dec. 23, 2013), the teachings of which are incorporated herein in their entireties by reference.

TECHNICAL FIELD

The present disclosure relates to a method for detecting and processing a Radio Link Failure (RLF) by a user equipment, and particularly, to a method and an apparatus for processing an RLF if a user equipment detects the occurrence of the RLF in a cell associated with a particular base station when the user equipment accesses at least two cells of different base stations.

BACKGROUND ART

Due to advances in communication systems, various types of wireless terminals have been introduced to consumers such as companies and individuals.

A current mobile communication system has been affiliated with Third Generation Partnership Project (3GPP), for example, Long Term Evolution (LTE), LTE-Advanced (LTE-A), and the like. Such a mobile communication system requires transmitting, receiving, and processing a large amount of data at a high-speed. Furthermore, the mobile communication system requires capability of transmitting and receiving various types of data, such as multimedia data and radio signal, as well as voice data.

Many studies have been conducted to develop a data processing technology using multiple cells to transmit data in order to transmit a large amount of data at a high speed.

An RLF denotes detection of error when a problem occurs in communication between a user equipment and a base station. When the RLF occurs, the user equipment performs a processing procedure for resuming communication with the base station.

Accordingly, there is a demand for a method for detecting a cell associated RLF when the RLF occurs in some of multiple cells in an environment where the user equipment communicates with the multiple cells provided by multiple different base stations, restoring the cell associated with the RLF to its original state, and resuming the communication with the multiple cells.

DETAILED DESCRIPTION OF THE INVENTION

Technical Problem

According to the above-mentioned requirements, it is necessary to detect the occurrence of an RLF in each of a cell associated with a first base station and a cell associated with a second base station in an environment where a user equipment forms a dual connectivity with at least two base stations.

Also, when the RLF is detected, it is necessary to rapidly repair the RLF according to a base station associated with the cell having the RLF.

Further, when an RLF occurs in a cell associated with one of base stations in the dual connectivity environment, it is possible to process data through the other base station. Accordingly, there is a demand for a method for repairing an RLF in view of this configuration.

Technical Solution

In order to solve the above-mentioned technical problems, in accordance with an aspect of the present disclosure, there is provided a method for processing a Radio Link Failure (RLF) by a User Equipment (UE). The method includes: configuring a dual connectivity with at least one cell associated with a first Base Station (BS) and at least one cell associated with a second BS; detecting occurrence of an RLF for at least one of the at least one cell associated with the first BS and the at least one cell associated with the second BS; transmitting an RLF-related signal to the first BS or the second BS; and receiving establishment information for processing the RLF.

Also, in accordance with another aspect of the present disclosure, there is provided a method of a first Base Station (BS) for controlling processing of a Radio Link Failure (RLF) of a User Equipment (UE). The method includes: receiving an RLF-related signal from at least one of the UE and a second BS that provides additional radio resources to the UE; generating establishment information for processing the RLF; and transmitting the establishment information for processing the RLF.

Also, in accordance with still another aspect of the present disclosure, there is provided a method of a second Base Station (BS) for controlling processing of a Radio Link Failure (RLF) of a User Equipment (UE). The method includes: configuring a dual connectivity with respect to the UE, by the second BS together with a first BS providing radio resources to the UE; and receiving, from at least one of the UE and the first BS, an RLF-related signal including one piece of information among information indicating occurrence of an RLF in a cell associated with the first BS and suspend indication information of a cell associated with the second BS.

Also, in accordance with yet another aspect of the present disclosure, there is provided a User Equipment (UE) apparatus for processing a Radio Link Failure (RLF). The UE apparatus includes a control unit, a transmission unit, and a reception unit. The control unit may be configured to configure a dual connectivity with at least one cell associated with a first Base Station (BS) and at least one cell associated with a second BS. Furthermore, the control unit may be configured to detect occurrence of the RLF in at least one of the at least one cell associated with the first BS and the at least one cell associated with the second BS. The transmission unit may be configured to transmit an RLF-related signal to the first BS or the second BS. The reception unit may be configured to receive establishment information for processing the RLF.

Also, in accordance with still yet another aspect of the present disclosure, there is provided a Base Station (BS) apparatus in a first BS for controlling processing of a Radio Link Failure (RLF) by a User Equipment (UE). The BS apparatus includes: a reception unit, a control unit, and a transmission unit. The reception unit is configured to receive an RLF-related signal from the UE or a second BS providing additional radio resources to the UE. The control unit is configured to generate establishment information for processing an RLF. The transmission unit is configured to transmit the establishment information for processing the RLF.

Further, in accordance with further another aspect of the present disclosure, there is provided a second Base Station (BS) for controlling processing of a Radio Link Failure (RLF) of a User Equipment (UE). The BS apparatus includes: a control unit configured to configure a dual connectivity with respect to a UE, wherein the control unit and a first BS providing radio resources to the UE configure the dual connectivity together; and a reception unit configured to receive, from the UE or the first BS, an RLF-related signal including one piece of information among information indicating occurrence of an RLF in a cell associated with the first BS and suspend indication information of a cell associated with the second BS.

Advantageous Effects

As described above, in accordance with embodiments of the present disclosure, the occurrence of an RLF is advantageously detected in each one of cells associated with a first base station and a second base station in an environment where a user equipment forms a dual connectivity with at least two base stations.

Also, in accordance with embodiments of the present disclosure, the RLF is advantageously and rapidly repaired according to a base station associated with a cell having the RLF when the RLF is detected.

Further, when RLF occurs in a cell associated with one of base stations in a dual connectivity environment, data can be processed through the other base station in accordance with embodiments of the present disclosure.

BRIEF DESCRIPTION OF THE DRAWINGS

FIG. 3 is a diagram exemplary illustrating a message included in an RLF-related signal according to an embodiment of the present disclosure.

FIG. 4 is a diagram exemplary illustrating a message included in an RLF-related signal according to another embodiment of the present disclosure.

FIG. 5 is a diagram exemplary illustrating establishment information according to an embodiment of the present disclosure.

FIG. 6 is a diagram illustrating operations of a user equipment and base stations when an RLF occurs in a cell associated with a first base station according to an embodiment of the present disclosure.

FIG. 7 is a diagram illustrating a message in an RLF-related signal according to another embodiment of the present disclosure.

FIG. 8 is a diagram illustrating a message in establishment information according to another embodiment of the present disclosure.

MODE FOR CARRYING OUT THE INVENTION

Figure 1:
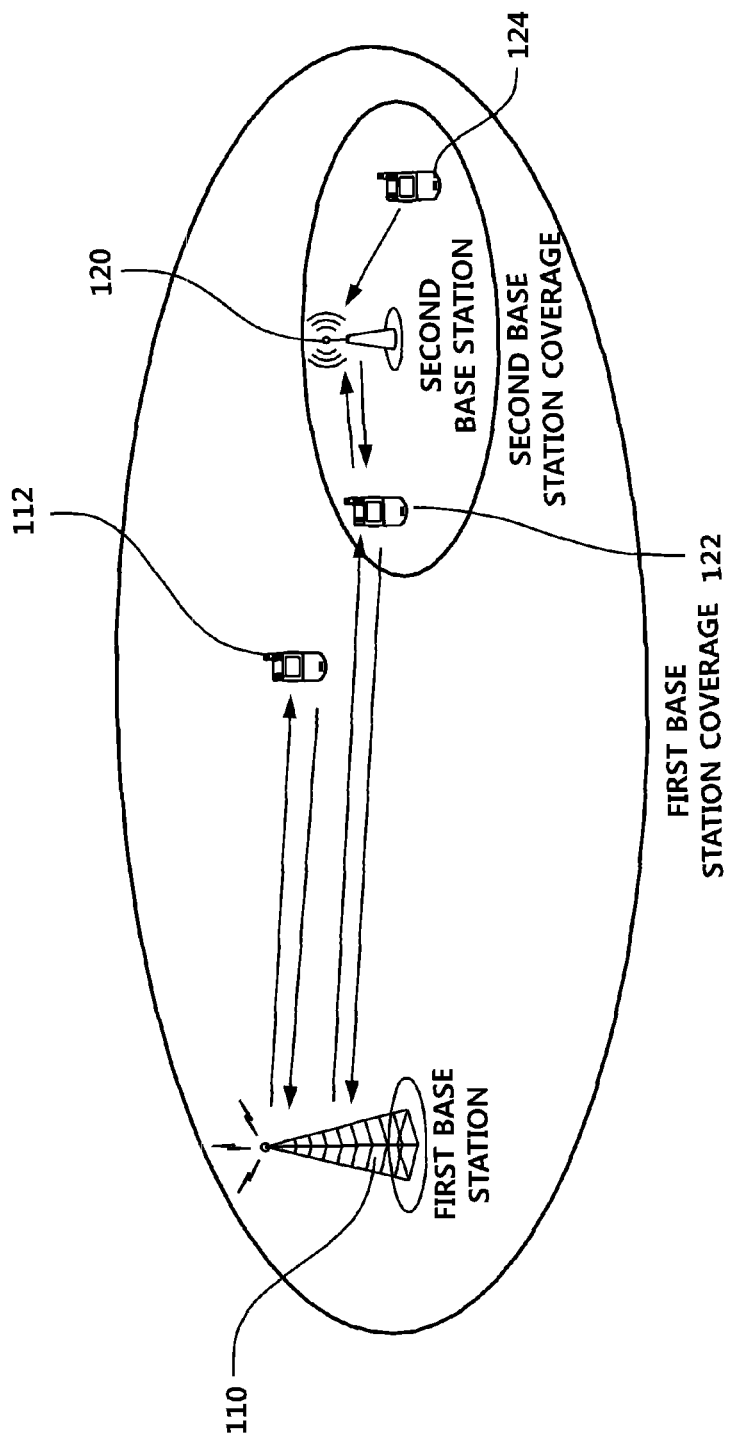
FIG. 1 illustrates a communication environment where a user equipment configures a dual connectivity with multiple different base stations and communicates therewith, to which embodiments of the present disclosure are applied.

Hereinafter, embodiments of the present disclosure will be described with reference to the exemplary drawings. In the following description, the same elements will be designated by the same reference numerals although they are shown in different drawings. Further, in the following description of embodiments of the present disclosure, a detailed description of known functions and configurations incorporated herein will be omitted when it may make the subject matter of the present disclosure rather unclear.

The wireless communication system may be widely installed so as to provide various communication services, such as a voice service, a packet data service, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global system for mobile communications (GSM).

Hereinafter, in this specification, the UE may be simply referred to as a "terminal."

A base station or a cell may generally refer to a station where communication with a User Equipment (UE) is performed. Such a base station may also be referred to as a Node-B, an evolved Node-B (eNB), a Sector, a Site, a Base Transceiver System (BTS), an Access Point (AP), a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an RRU, and an RU, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields to which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

As an example of a BS, the multiple transmission/reception points may be at least one RRH that is connected to the BS, a macro cell, or an eNB through an optical cable or an optical fiber and is controlled by wire, and has high transmission power or has low transmission power in an area of the macro cell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

Meanwhile, higher layer signaling described hereinafter includes an RRC parameter, and includes RRC signaling (or an RRC message), through which RRC information is transmitted.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A small cell environment using a low-power node is considered as a means for coping with mobile traffic explosion. A low-power node refers to a node using lower transmission (Tx) power than that of a typical macro node.

Through Carrier Aggregation (hereinafter referred to as "CA") technology of the related art, a small cell may be built by using low-power Remote Radio Head (RRH) which is geographically-distributed antennas within a macro cell coverage.

However, in order to apply the CA technology, the macro cell and the RRH cell are built to be scheduled under the control of one BS. To this end, it is necessary to build an ideal backhaul between the macro cell node (or BS) and the RRH.

The ideal backhaul refers to a backhaul showing very high data throughput and a very short delay time, such as a dedicated point-to-point connection using an optical line (optical fiber) and a Line-Of-Sight (LOS) microwave.

In contrast, a non-ideal backhaul refers to a backhaul showing relatively low data throughput and a relatively long delay time, such as a Digital Subscriber Line (xDSL) and a non-LOS microwave.

Through the CA technology, multiple serving cells may be aggregated in order to provide a service to the UE. Specifically, the multiple serving cells may be configured for the UE in a Radio Resource Control (RRC)-connected state, and the macro cell and the RRH cell may be configured together as serving cells and may provide a service to the UE, when the ideal backhaul is built between the macro cell node and the RRH.

When the CA technology is configured, the UE may have only one RRC connection to a network. At RRC connection establishment/re-establishment/handover, one serving cell provides the Non-Access Stratum (NAS) mobility information (e.g., a Tracking Area Identity (TAI)), and at RRC connection re-establishment/handover, one serving cell provides a security input. In the CA, such a cell is referred to as a "PCell (Primary Cell)." The PCell may be changed according to only a handover procedure.

According to UE capabilities, Secondary Cells (SCells) and a PCell may be configured together as a serving cell. The addition and removal of SCells are performed by higher layer signaling (e.g., an RRC message). When a new SCell is added, dedicated RRC signaling is used to transmit all pieces of required system information of a SCell. Specifically, in a connected mode, the UE does not need to acquire system information directly broadcasted by SCells.

Meanwhile, an RLF refers to a case where a problem occurs in a connection state between a BS providing a serving cell and the UE.

Specifically, for example, the UE may detect the occurrence of the RLF in the following cases.

The UE detects the occurrence of the RLF when out-of-synchronization occurs in a physical layer.

The UE detects the occurrence of the RLF when a random access problem occurs in a Medium Access Control (MAC) layer.

The UE detects the occurrence of the RLF when the maximum number of times of retransmission is reached in a Radio Link Control (RLC) layer.

In the three cases described above as an example, the UE may detect the occurrence of the RLF.

If the UE detects the RLF, when Access Stratum (AS) security is activated, the UE performs an RRC connection re-establishment procedure. When the AS security is not activated, the UE immediately enters an idle state.

Typically, a UE, which is accessing multiple cells as in the above-described CA, detects an RLF for a PCell, but does not detect an RLF for a SCell. When detecting the RLF for the PCell, the UE performs an RRC connection re-establishment procedure and, at this time, releases the SCell. Thereafter, the UE may establish addition of a SCell through the RRC connection re-establishment procedure, and then may newly use the SCell.

When detecting the RLF, the UE may store, in a VarRLF-Report, RLF-related information as shown Table 1 below.

TABLE 1

Information stored in VarRLF-Report

| Field | Description |
| --- | --- |
| plmn-IdentityList | List of PLMN Identity broadcasted through SIB1 |
| measResultLastServCell | Resulting values (RSRP and RSRQ) of PCell lastly measured when RLF occurs |
| measResultNeighCells | List (in order of good values) of resulting values of neighboring cells measured when RLF occurs |
| Location information | Location info value (e.g., GPS) of UE |
| failedPCellId | ID (global cell identity or physical cell identity) of PCell |
| reestablishmentCellId | ID of cell which has attempted re-establishment after RLF |
| timeConnFailure | Time period until connection fails from time point of initiating handover |
| connectionFailureType | Type (RLF or HOF) of connection failure |
| previousPCellId | ID of source PCell during final handover |
| c-RNTI | C-RNTI that UE is using in PCell |
| rlf-Cause | Causes (r310Expiry. randomAccessProblem, and rlc-MaxNumRetx) of occurrence of RLF |
| timeSinceFailure | Time period elapsed after failure of connection |

When the UE having the above-described RLF-related information subsequently performs a RRC connection re-establishment/RRC connection re-configuration/RRC connection establishment procedure, the UE sets, to true, an rlf-InfoAvailable of an RRCConnectionReestablishmentComplete/RRCConnectionReconfigurationComplete/RRC-ConnectionSetupComplete message. Then, the UE transmits, to the BS, the message having the rlf-InfoAvailable set to true.

The BS receives the above-described message and sets, to true, an rlf-ReportReq of a UE information request message in order to obtain an RLF report. The BS transmits, to the UE, the UE information request message having the rlf-ReportReq set to true. The UE receives the UE information request message, includes an rlf-Report in a UE information response message, and transmits, to the BS, the UE information response message including the rlf-Report.

In the above-described CA, a PCell and a SCell belong to an identical BS and data is not transmitted in such a manner that a discrimination is made between pieces of data according to a cell. Accordingly, even when a communication failure occurs in the SCell, data is continuously transmitted and received on the PCell, so that problems do not occur.

However, in a dual connectivity situation, to which embodiments of the present disclosure are applied, a cell associated with a first BS and a cell associated with a second BS belong to different BSs, and a radio bearer may be independently configured for each cell.

Accordingly, in this case, when a communication failure occurs in a cell associated with the second BS, it is problematic in that data may not be transmitted through a radio bearer configured through the cell associated with the second BS.

In contrast, when an RLF occurs in a cell associated with the first BS, typically, the UE releases all SCells that the UE is accessing and starts an RRC connection re-establishment procedure.

Specifically, differently from the typical method, in the dual connectivity environment, a cell associated with the first BS and a cell associated with the second BS are provided by different BSs. Accordingly, even when an RLF has occurred in the cell associated with the first BS, data may be transmitted and received on the cell associated with the second BS without any problems. In this case, when all of the cells are released as in the typical case, a problem occurs in that an inefficient and unnecessary re-establishment operation may be performed.

A method may be provided for a UE to efficiently repair an RLF without performing an unnecessary re-establishment operation when the RLF occurs in a cell associated with at least one of multiple BSs in a dual connectivity environment in accordance with at least one embodiment. Hereinafter, such a method will be described in detail.

In this specification, the term "dual connectivity" may refer to a case where a UE communicates with multiple BSs connected via a non-ideal backhaul. Specifically, the UE may configure a dual connectivity with a BS providing a macro cell and a BS providing a small cell, or the UE may configure a dual connectivity with multiple BSs providing small cells.

In this case, the UE may transmit and receive data with the multiple BSs and may configure a radio bearer with the multiple BSs. For example, multiple radio bearers may be configured in each of the multiple BSs, or one radio bearer may be split to be configured through the multiple BSs.

In this specification, when the UE configures a dual connectivity, a BS will be described as a master BS or a first BS if the BS forms an RRC connection with the UE and provides a PCell that becomes a reference of a handover or if the BS terminates an S1-Mobility Management Entity (MME) and serves as a mobility anchor in a core network.

The master BS or the first BS may be a BS which provides a macro cell or a BS which provides any one small cell in a situation of a dual connectivity between small cells.

Meanwhile, in a dual connectivity environment, a BS will be referred to as a secondary BS or a second BS if the BS is distinguished from the master BS and provides additional radio resources to the UE.

Each of the first BS (or the master BS) and the second BS (or the secondary BS) may provide at least one cell to the UE. The first BS and the second BS may be connected to each other through an interface therebetween.

Also, in order to help understanding, a cell associated with the first BS may be described as a macro cell, and a cell associated with the second BS may be described as a small cell. A small cell cluster scenario forms a dual connectivity with the multiple BSs providing small cells. In this a small cell cluster scenario, even a cell associated with the first BS may be described as a small cell.

In embodiments of the present disclosure, a macro cell may signify each of one or more cells. The macro cell may be described as meaning a representative of all cells associated with the first BS. Also, a small cell may signify each of one or more cells. The small cell may be described as meaning a representative of all cells associated with the second BS. However, as described above, in a particular scenario such as a small cell cluster, a small cell may be a cell associated with the first BS. In this case, a cell of the second BS may be described as another small cell or still another small cell.

FIG. 1 is a view illustrating communication environment, in which a UE configures a dual connectivity with multiple different BSs and communicates therewith, to which embodiments of the present disclosure are applied.

Referring to FIG. 1, a UE 122 may configure a dual connectivity with a first BS 110 and a second BS 120. The UE 122, which has configured the dual connectivity, may transmit and receive information via a radio link of each of the first BS 110 and the second BS 120.

Another UE 112 may transmit and receive information to/from only the first BS 110, and still another UE 124 may transmit and receive information to/from only the second BS 120.

In this case, the UE 122 may transmit and receive information to/from at least one cell associated with the first BS 110 and at least one cell associated with the second BS 120.

In accordance with at least one embodiment, the UE 122 configuring the dual connectivity repairs and processes an RLF when the RLF occurs in a cell associated with the first BS and a cell associated with the second BS. Hereinafter, such a method of a UE for repairing and processing RLF will be described in detail.

In accordance with at least one embodiment, a method may be provided for processing an RLF by a UE. The method includes: configuring a dual connectivity with at least one cell associated with a first BS and at least one cell associated with a second BS; detecting occurrence of an RLF for at least one of the at least one cell associated with the first BS and the at least one cell associated with the second BS; transmitting an RLF-related signal to at least one of the first BS and the second BS; and receiving establishment information for processing the RLF.

Specifically, the UE detects an RLF in a cell associated with the second BS independently from the existing cell associated with the first BS. When the RLF occurs in the cell associated with the second BS, the UE may transmit, to the first BS, a signal including information indicating the occurrence of the RLF in the cell associated with the second BS.

Alternatively, the UE may continuously use the cell associated with the second BS before detecting the occurrence of the RLF, in such a manner that the UE does not release the cell associated with the second BS when the RLF occurs in the cell associated with the first BS and transmits the above-described information on the cell associated with the second BS to the first BS when the UE is again connected to the first BS.

Alternatively, when the RLF occurs in the cell associated with the first BS, the UE may transmit the relevant information to the second BS and may change the second BS to a master BS. Specifically, a configuration may be changed such that the second BS serves as the above-described master BS.

When the UE according to an embodiment of the present disclosure independently detects the occurrence of the RLF in the cell associated with the first BS and the occurrence of the RLF in the cell associated with the second BS, cases described in Table 2 below may be considered.

TABLE 2

| Cases of occurrences of RLF | | | |
|---|---|---|---|
| Case | First BS | Second BS | Description |
| 1 | OK | Occurrence of RLF | When cell associated with first BS is performing normal communication and RLF occurs in cell associated with second BS |

TABLE 2-continued

Cases of occurrences of RLF

| Case | First BS | Second BS | Description |
|---|---|---|---|
| 2 | Occurrence of RLF | OK | When cell associated with second BS is performing normal communication and RLF occurs in cell associated with first BS |
| 3 | Occurrence of RLF | Occurrence of RLF | When RLF is detected sequentially or simultaneously in cell associated with first BS and cell associated with second BS |

Hereinafter, embodiments of the present disclosure are classified according to the cases described in Table 2, and the classified embodiments will be described. For example, when multiple cells are associated with the first BS and multiple cells associated with the second BS, and when RLF occurs in all of the cells associated with each BS, a method for processing the RLF according to embodiments of the present disclosure will be described. For convenience and ease of understanding, a method of processing a RLF when the RLF occurs in one of cells associated with the first BS and cells associated with the second BS will be described. However, such method will be similarly applied to all of the cases described above.

Hereinafter, three embodiments for processing the occurrence of an RLF will be described. However, a method of processing the RLF is not limited to the three embodiments. For example, such a method of processing the RLF according to the present disclosure may apply to all cases of generating a problem in communication between a UE and a BS.

Also, embodiments of the present disclosure may be applied to only a particular cause that occurs the RLF, for example, when the maximum number of times of retransmission is reached in an RLC layer. However, the embodiments are not limited thereto. For example, embodiments of the present disclosure may be applied regardless of the type of causes occurring the RLF. Furthermore, a particular embodiment of the present disclosure may be performed according to a type of RLF.

First Embodiment: When a Cell Associated with a First BS is Performing Normal Communication and an RLF is Detected in a Cell Associated with a Second BS FIG. 2 is a diagram exemplary illustrating operations of a UE and BSs when an RLF occurs in a cell associated with a second BS according to at least one embodiment of the present disclosure.

In accordance with at least one embodiment of the present disclosure, a method may be provided for processing an RLF by a UE. The method includes: configuring a dual connectivity with at least one cell associated with a first BS and at least one cell associated with a second BS; detecting occurrence of an RLF for at least one of the at least one cell associated with the first BS and the at least one cell associated with the second BS; transmitting an RLF-related signal to the first BS or the second BS; and receiving establishment information for processing the RLF.

Also, when a detected cell having an RLF is a cell associated with the second BS, the UE transmits, to the first BS, an RLF-related signal including at least one piece of information among information indicating the occurrence of the RLF in the cell associated with the second BS, RLF cause information, and index information indicating the cell having the RLF.

Figure 2:
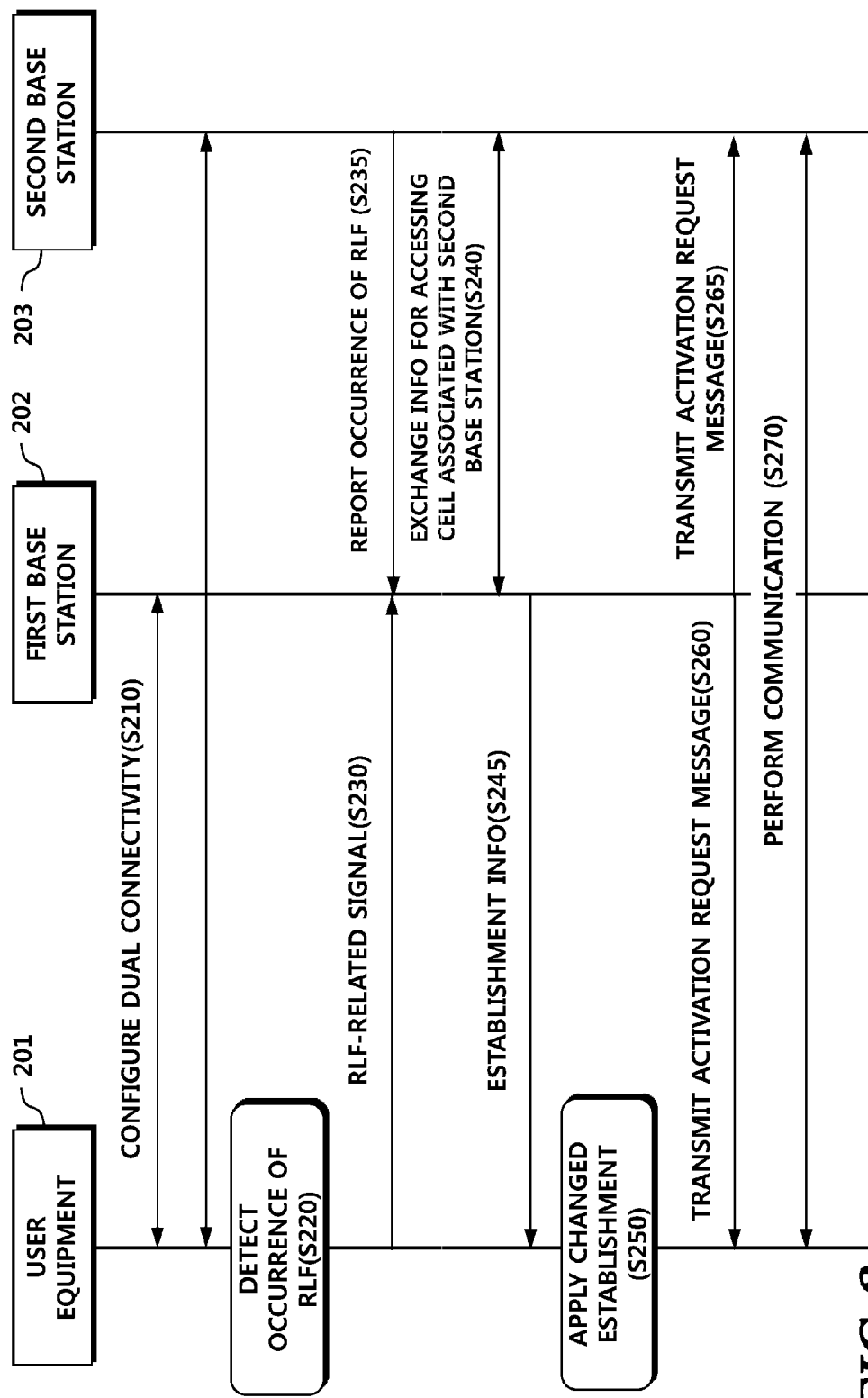
FIG. 2 illustrates operations of a user equipment and base stations when an RLF occurs in a cell associated with a second base station, according to an embodiment of the present disclosure.

Referring to FIG. 2, in step S210, the UE 201 configures a dual connectivity with the first BS 202 and the second BS 203. The dual connectivity may be configured by adding/modifying radio resources of the second BS.

The UE 201 independently detects the occurrence of an RLF for the cell associated with the first BS and the occurrence of an RLF for the cell associated with the second BS.

When the RLF has occurred in the cell associated with the second BS, the UE 201 has a problem in communication with the second BS. For example, the UE 201 cannot communicate with the second BS 203.

In this case, in step S220, the UE 201 detects the occurrence of the RLF in the cell associated with the second BS.

For example, the occurrence of the RLF in the cell associated with the second BS may be detected when out-of-synchronization occurs (more than the predetermined number of times) in a physical layer, or when a random access problem occurs in an MAC layer, or when the maximum number of times of retransmission is reached in an RLC layer.

When a cell having the RLF is the cell associated with the second BS, in step S230, the UE 201 may transmit, to the first BS 202, an RLF-related signal including information indicating the occurrence of the RLF in the cell associated with the second BS.

Specifically, when a detected cell having the RLF is the cell associated with the second BS, in step S230, the UE 201 may include, in an RLF-related signal, information representing the occurrence of the RLF in the cell associated with the second BS and may transmit the RLF-related signal including the information through higher layer signaling.

Also, the RLF-related signal may include at least one piece of information among information indicating the occurrence of the RLF in the cell associated with the second BS, RLF cause information, and index information indicating the cell having the RLF. Specifically, the RLF-related signal transmitted by the UE 201 to the first BS 202 may include occurrence cause information and/or index information indicating a particular cell associated with the second BS, in which the RLF has occurred, as well as the information indicating the occurrence of the RLF. The index information may include information, which allows a cell to be distinguished from another cell, and may be variously represented as identifier information, identification information, cell index information, and the like.

Also, when the RLF has occurred, in step S235, the second BS 203 may transmit, to the first BS 202, the information indicating the occurrence of the RLF. When the second BS reports the occurrence of the RLF to the first BS, the report of the occurrence of the RLF may be delivered through the above-described interface between the first BS and the second BS. Step S230 and step S235 may be performed simultaneously, but embodiments are not limited thereto. For example, one of step S230 and step S235 may be performed.

In step S240, the first BS 202 may exchange information required to restore the cell having the RLF to its original state with the second BS 203. Here, a cell selected to restore the cell having the RLF may be the cell associated with the second BS having the RLF or another BS, for example, a third BS. Here, for convenience of description, the selected cell is described as the cell associated with the second BS, but the embodiments of the present disclosure are not limited thereto. For example, the selected cell may be the third BS. In the case of the third BS, steps S240, S265 and S270 may be performed between the first BS or UE and the third BS.

In step S245, the first BS 202 transmits the changed establishment information to the UE 201 in order to repair the occurrence of the RLF.

In step S250, the UE 201 may configure a new radio link by applying the changed establishment information.

Thereafter, in steps S260 and S265, the first BS 202 transmits an activation request message when a cell is associated with a newly configured second BS is configured, or when the cell associated with the second BS having the RLF is repaired, or when a cell associated with the third BS is configured. However, when the newly-configured cell and the like are in an activated state, the step of transmitting the activation request message may be omitted.

In step S270, the UE 201 may resume/perform communication on the restored cell or the newly-configured cell.

FIG. 3 is a diagram exemplary illustrating a message included in an RLF-related signal in accordance with at least one embodiment.

The RLF-related signal described with reference to FIG. 2 may include at least one piece of information among information indicating the occurrence of an RLF in a cell associated with the second BS, RLF cause information, and index information indicating a cell having an RLF. The RLF-related signal may be transmitted through higher layer signaling (e.g., RRC signaling).

Referring to FIG. 3, for example, an RLF-related signal may be transmitted through an RRC connection re-establishment request message.

In this case, an RLF in a cell associated with the second BS may be indicated by adding an SeNBFailure element in ReestablishmentCause. Also, the RLF-related signal may include RLF cause information.

FIG. 4 is a diagram exemplary illustrating a message included in an RLF-related signal according to another embodiment.

Referring to FIG. 4, the RLF-related signal may further include the above-described index information indicating a cell in which an RLF occurs.

The RLF-related signal may be transmitted through an RRC connection re-establishment request message and may further include index information indicating a cell having an RLF in addition to the information illustrated in FIG. 3.

For example, by adding SCellFailure and ServCellIndex elements to the RLF-related signal as illustrated in FIG. 4, the occurrence of an RLF in a cell associated with the second BS and index information of the relevant cell associated with the second BS may be included in the RLF-related signal, and the RLF-related signal including the occurrence of the RLF and the index information may be transmitted.

Here, SCellFailure may include information indicating the occurrence of the RLF in the cell associated with the second BS and may be expressed as SeNBFailure illustrated in FIG. 3. Also, ServCellIndex is expressed as an example and may be variously expressed as SeNBCellIndex and the like. Accordingly, a SCell illustrated in FIG. 4 refers to a cell associated with the second BS.

FIG. 5 is a diagram exemplary illustrating establishment information in accordance with at least one embodiment.

In accordance with at least one embodiment, the UE 201 receives establishment information for processing an RLF from the first BS after the step of transmitting the RLF-related signal.

In accordance with at least one embodiment, the establishment information may include at least one piece of information among information for re-establishing and releasing a cell having an RLF and information for changing a radio bearer to a cell associated with the first BS.

The above-described establishment information may be transmitted through high layer signaling.

Referring to FIG. 5, for example, establishment information for processing an RLF in a cell associated with the second BS may be transmitted through change of a SCell-ToAddMod element, a radioResourceConfigCommonSCell element, and a radioResourceConfigDedicatedSCell element, in a typical RRC connection reconfiguration procedure.

The UE may receive change information on the change of the SCellToAddMod element, the radioResourceConfigCommonSCell element, and the radioResourceConfigDedicatedSCell element and may re-establish or change a cell associated with the second BS by changing cell information associated with the second BS on the basis of the received change information.

According to the above-described establishment information, a cell associated with the second BS and resumed to communicate with the UE 201 may be a cell associated with the second BS having the RLF, a new cell associated with the second BS, or a cell associated with the third BS.

In FIG. 5, a SCell may refer to a cell associated with the second BS or may be differently expressed as SeNBCell-ToAddMod.

Hereinafter, the first embodiment of the present disclosure will be described in detail based on an example of the higher layer signaling with reference to FIG. 3 to FIG. 5.

1. The UE performs physical layer monitoring on each of a cell associated with the first BS and a cell associated with the second BS. For example, the UE may monitor one representative cell among cells associated with the second BS, or may monitor all of the cells associated with the second BS.

2. When a synchronization problem (e.g., out-of-synchronization) occurs in a physical layer of a cell (e.g., the above-described one representative cell or all of the cells) associated with the second BS, the UE declares an RLF occurring in the cell associated with the second BS.

For example, when out-of-synchronization indications, more than or equal to a predetermined threshold value, are delivered from a physical layer, an RRC layer of the UE declares an RLF. Alternatively, when random access problem indication is delivered from an MAC layer, the RRC layer of the UE declares an RLF. Furthermore, when the maximum number of times of retransmission is reached in an RLC layer, the RRC layer of the UE declares an RLF.

3. The UE transmits, to the first BS, an RLF-related signal including indication information notifying of an RLF in a cell associated with the second BS. The RLF-related signal may be transmitted through higher layer signaling. For example, the indication information may be included in an existing RRC message, or a new RRC message for transmitting the indication information may be defined. Alternatively, as another example, the above-described RLF-related signal of a cell associated with the second BS may be delivered through an RRC connection re-establishment request message. Hereinafter, for convenience and ease of understanding, the RRC connection re-establishment request message is described as an example of the RLF-related signal including the indication information notifying of an RLF of a cell associated with the second BS. However, embodiments of the present disclosure are not limited thereto. Specifically, as described above, the RLF-related signal may be transmitted through higher layer signaling or may be transmitted through the typical RRC message or a newly-defined RRC message.

Alternatively, the second BS may directly report, to the first BS, the occurrence of the RLF in the cell associated with the second BS, which is reported by the relevant UE, through an interface between the BSs.

For example, when an RLF indication signal of a cell associated with the second BS is delivered to higher layer signaling (e.g., an RRC connection re-establishment request message), SeNBFailure of ReestablishmentCause may be added as illustrated in FIG. 3 and may be used as the indication information notifying of the RLF in the cell associated with the second BS.

Also, as described with reference to FIG. 4, a cell index may be further included to be capable of notifying of the occurrence of an RLF in which cell associated with the second BS. For example, a SCellFailure element and a ServCellIndex element may be added to a new RRC message, the typical RRC message, or an RRC connection re-establishment request message, the occurrence of an RLF in a cell associated with the second BS and index information of the relevant cell associated with the second BS are included in the message, and the message, which includes the occurrence of the RLF in the cell associated with the second BS and the index information of the relevant cell, may be transmitted to the first BS.

4. The first BS receives the above-described RLF-related signal, changes the establishment of the relevant cell associated with the second BS, and transmits the changed establishment to the UE.

As an example, as described with reference to FIG. 5, change establishment information on a cell associated with the second BS may change cell information associated with the second BS through change of a SCellToAddMod element, a radioResourceConfigCommonSCell element, and a radioResourceConfigDedicatedSCell element in a typical RRC connection reconfiguration procedure, and thereby may re-establish or change a cell associated with the second BS.

Specifically, the first BS may transmit, to the UE, the cell establishment information associated with the second BS which has been changed through the change of the above-described information elements (e.g., the SCellToAddMod element, the radioResourceConfigCommonSCell element, and the radioResourceConfigDedicatedSCell element).

Alternatively, data transmitted to the cell associated with the second BS having the RLF is transmitted to a cell associated with the first BS, the relevant cell associated with the second BS may be released, and the establishment of a cell associated with the first BS may be changed. Specifically, a radio bearer and the like established in the relevant cell associated with the second BS may be established to be changed to a cell associated with the first BS.

5. The UE applies the changed cell establishment (or cell release associated with the second BS and cell information associated with the first BS) information associated with the second BS which has been received from the BS. Also, the BS may transmit an activation request message to the relevant UE, and the UE may resume communication with the cell associated with the second BS, according to the changed cell establishment information associated with the second BS.

At this time, the first BS may exchange required information (e.g., cell establishment information associated with the second BS of the UE, etc.) with the second BS. In this case, the first BS may exchange information through an interface between the first BS and the second BS.

The above-described cell associated with the second BS, with which the UE has resumed the communication, may be the cell associated with the second BS which has previously accessed, or may be a new cell associated with the second BS. Specifically, the UE may resume communication with the cell associated with the second BS having the RLF based on the establishment information transmitted by the BS, or may start communication with a new cell associated with the second BS which is not the cell associated with the second BS having the RLF. Alternatively, the above-described cell associated with the second BS, with which the UE has resumed the communication, may be a cell associated with the third BS.

Second Embodiment: When a Cell Associated with a Second BS is Performing Normal Communication and an RLF is Detected in a Cell Associated with a First BS FIG. 6 is a diagram exemplary illustrating operations of a UE and BSs when an RLF occurs in a cell associated with a first BS according to at least one embodiment of the present disclosure.

In accordance with at least one embodiment, a method may be provided for processing an RLF by a UE. The method includes: configuring a dual connectivity with at least one cell associated with a first BS and at least one cell associated with a second BS; detecting occurrence of an RLF for at least one of the at least one cell associated with the first BS and the at least one cell associated with the second BS; transmitting an RLF-related signal to the first BS or the second BS; and receiving establishment information for processing the RLF.

Also, the RLF-related signal may be transmitted to the second BS and may include suspend indication information of the cell associated with the second BS in accordance with at least one embodiment.

Referring to FIG. 6, the UE 601 configures a dual connectivity with the first BS 602 and the second BS 603 in step S610. The UE 601 detects the occurrence of an RLF in a cell associated with the first BS in step S620.

As described above, the occurrence of an RLF in a cell associated with the first BS may be detected when out-of-synchronization occurs (more than the predetermined number of times) in a physical layer, when a random access problem occurs in an MAC layer, or when the maximum number of times of retransmission is reached in an RLC layer.

When the RLF has been detected in the cell associated with the first BS in step S620, the UE 601 suspends access with a cell associated with the second BS. Alternatively, the UE 601 may maintain communication until the UE 601 is changed to an idle state.

When the UE 601 suspends the access with the cell associated with the second BS, the UE 601 may explicitly transmit suspend indication information to the second BS 603 in step S625, or may implicitly stop the transmission and reception of data to/from the cell associated with the second BS, and thereby may notify the second BS 603 of suspending the access.

Specifically, the UE 601 may transmit an indication signal including the suspend indication information to the second BS 603 in step S625, or may stop the transmission of data to the second BS 603. Thereby, the UE 601 may suspend the access with the cell associated with the second BS in step S635.

After the step of transmitting the RLF-related signal, the method for processing the RLF by the UE 601 may further include a step of transmitting representation information representing the possession of related establishment information on the suspended cell associated with the second BS to a target BS for RRC re-establishment and a step of receiving request information from the target BS and transmitting related establishment information on the suspended cell associated with the second BS.

The UE 601 suspends the access with the cell associated with the second BS and then performs a procedure for processing the occurrence of the RLF in the cell associated with the first BS, between the UE 601 and the first BS having the RLF.

The procedure for processing the occurrence of the RLF (e.g., an RRC connection re-establishment procedure) will be described in detail.

The UE 601 suspends the access with the cell associated with the second BS and then transmits higher layer signaling to the first BS 602 in order to process the occurrence of the RLF in the cell associated with the first BS. As an example, the higher layer signaling may be an RRC connection re-establishment request message. The first BS 602 transmits RRC connection re-establishment information to the UE 601, and the UE 601 re-establishes access with a cell associated with the first BS on the basis of the received RRC connection re-establishment information.

In this case, the re-established cell associated with the first BS may be the existing cell associated with the first BS, in which the RLF has occurred, or may be another cell associated with the first BS which is not the existing cell associated with the first BS. Alternatively, the re-established cell associated with the first BS may be a cell associated with another BS which is not the first BS.

When the above-described RRC connection re-establishment procedure is completed, the UE 601 transmits an RRC connection re-establishment completion message to a BS, with which the RRC connection has been re-established. Here, for convenience of description, the re-establishment of an RRC connection with the first BS 602 is described, but embodiments of the present invention are not limited thereto.

The RRC connection re-establishment completion message may include the above-described representation information representing the possession of the related establishment information on the suspended cell associated with the second BS. Accordingly, in step S630, the UE 601 transmits, to the first BS 602, the RRC connection re-establishment completion message including the representation information.

In step S640, the UE 601 receives, from the re-established first BS, a request for the related establishment information on the suspended cell associated with the second BS.

After receiving the request for the related establishment information on the suspended cell associated with the second BS, in step S650, the UE 601 may transmit, to the re-established first BS 602, the related establishment information related to the suspended cell associated with the second BS.

When receiving the establishment information related to the suspended cell associated with the second BS, in step S660, the first BS 602 which is accessing (i.e., which is established) may transmit, to the UE 601, the establishment information related to the suspended cell associated with the second BS. In other words, in step S650, the UE 601 receives signaling which requests the transmission of the establishment information related to the suspended cell associated with the second BS to the re-established first BS 602, and transmits the establishment information related to the cell associated with the second BS, with which the access has been suspended.

The first BS 602 generates cell establishment information associated with the second BS on the basis of the establishment information related to the suspended cell associated with the second BS which has been received from the UE 601. Thereafter, in step S655, the first BS 602 may exchange information for accessing a cell associated with the second BS 603, with the second BS 603 with which the UE 601 is to communicate.

The UE 601 receives, from the first BS 602, establishment information on a cell associated with the second BS in step S660. The UE 601 applies the changed establishment of a cell associated with the second BS 603 on the basis of the received establishment information in step S670.

As another example, the establishment information may not be changed differently from a case where the UE suspends a cell associated with the second BS. When the establishment information received from the first BS 602 is not changed as compared with information that the UE 601 has previously established, the UE 601 may apply the previous establishment.

In addition, although not illustrated in FIG. 6, the UE 601 may receive, from the first BS 602, an activation request message for starting communication with the established cell associated with the second BS and may start the communication.

In this case, in FIG. 6, a cell associated with the second BS, with which the UE 601 starts communication, is illustrated and described as the existing suspended cell associated with the second BS. However, the UE 601 may start communication with a new cell associated with the second BS, according to cell establishment information associated with the second BS which has been generated by the first BS 602.

The activation request message may be transmitted to not only the UE 601 but also the second BS 603 which is to communicate with the UE 601.

Hereinafter, referring to the accompanying drawings, a description will be made of an example of including, in the RRC connection re-establishment completion message described with reference to FIG. 6, representation information representing the possession of related establishment information on a cell associated with the second BS, and an example of the establishment information.

FIG. 7 is a diagram exemplary illustrating a message included in an RLF-related signal according to an embodiment of the present disclosure.

As described above, the UE may perform a re-establishment procedure between the UE and the first BS. When the re-establishment is completed, the UE may transmit representation information representing the possession of related establishment information on the suspended cell associated with the second BS.

As an example, the representation information may be included in an RRC connection re-establishment completion message. Specifically, during an RRC connection re-establishment procedure, the UE may transmit Indication (SCellInfoAvailable-r12) which indicates that the RRC connection re-establishment completion message has establishment information related to the suspended cell associated with the second BS.

Referring to FIG. 7, the UE may set the value of SCellInfoAvailable-r12 to true and may transmit the SCellInfoAvailable-r12 having the value set to true, and thereby may represent the possession of the establishment information related to the suspended cell associated with the second BS.

Alternatively, as another example, the information representing the possession of the establishment information related to the suspended cell associated with the second BS may be delivered through a procedure, such as an RRC connection establishment procedure, an RRC connection reconfiguration procedure, or the like.

Alternatively, the information representing the possession of the establishment information related to the suspended cell associated with the second BS may be repeatedly transmitted until the first BS takes back cell information associated with the second BS, during a predetermined time period after the occurrence of an RLF.

Specifically, whenever the UE makes or changes an RRC connection, the UE may transmit the RLF-related signal which includes representation information (indication) representing the possession of the establishment information related to the suspended cell associated with the second BS.

FIG. 8 is a diagram exemplary illustrating a message included in establishment information according to another embodiment of the present disclosure.

As described above with reference to FIG. 6, the UE receives, from the first BS, a request signal which requests the establishment information related to the suspended cell associated with the second BS.

The UE transmits, to the first BS, the establishment information related to the suspended cell associated with the second BS.

Referring to FIG. 8, the establishment information related to the suspended cell associated with the second BS may include pieces of information, such as establishment of a radio bearer for each cell, SCellToAddModList, RadioResourceConfigCommonSCell, RadioResourceConfigDedicatedSCell, SCellToReleaseList, and the like. Specifically, the establishment information related to the suspended cell associated with the second BS may include RadioResourceConfigCommonSCell, RadioResourceConfigDedicatedSCell, SCellToReleaseList, and information related to the establishment of a radio bearer.

Here, a SCell is described as an example of a cell associated with the second BS, and each information element may be represented as an information element representing the second BS (e.g., a Secondary eNB (SeNB)) instead of the SCell.

The first BS receives the related establishment information, may change the establishment information of the second BS, and may transmit the changed establishment information to the UE.

Hereinafter, the above-described method for processing an RLF when the RLF is detected in a cell associated with the first BS according to a second embodiment will be described in more detail.

1. The UE performs physical layer monitoring on each of a cell associated with the first BS and a cell associated with the second BS.

2. When a synchronization problem (e.g., out-of-synchronization) occurs in a physical layer of a cell associated with the first BS, the UE detects and declares an RLF in the cell associated with the first BS.

As another example of detecting the occurrence of an RLF, when out-of-synchronization indications are delivered from a physical layer, more than or equal to a predetermined threshold value, an RRC layer of the UE may detect and declare an RLF. Alternatively, when random access problem indication is delivered from an MAC layer, the RRC layer of the UE may detect and declare an RLF. Alternatively, when the maximum number of times of retransmission is reached in an RLC layer, the RRC layer of the UE may detect and declare an RLF.

3. When there is the cell associated with the second BS which the UE is accessing, the UE does not release the cell associated with the second BS, but suspends the cell associated with the second BS. Alternatively, the UE does not release the cell associated with the second BS, but may continuously communicate with the cell associated with the second BS until the UE enters an idle state.

In the process of suspending a cell associated with the second BS, the UE may explicitly transmit, to the second BS, an RLF-related signal including suspend indication information (or suspend indication) which indicates suspending of the cell associated with the second BS. Alternatively, the UE may stop transmission to the relevant cell associated with the second BS, and thereby may implicitly notify of suspending of the cell associated with the second BS.

4. Since the RLF has occurred, the UE performs an RRC connection re-establishment procedure on the cell associated with the first BS. At this time, a cell that the UE is to access may be the cell associated with the first BS that the UE has previously accessed, a cell associated with the first BS, or another call. During the RRC connection re-establishment procedure, the UE may include, in an RRC connection re-establishment complete message, representation information representing the possession of establishment information related to the suspended cell associated with the second BS, and may transmit the RRC connection re-establishment complete message including the representation information.

Specifically, as an example, as described above with reference to FIG. 7, by setting the value of SCellInfoAvailable-r12 to true and transmitting the SCellInfoAvailable-r12 having the value set to true, the possession of the establishment information related to the suspended cell associated with the second BS may be represented.

Alternatively, as another example, the information representing the possession of the establishment information related to the suspended cell associated with the second BS may be delivered through a procedure, such as an RRC connection establishment procedure, an RRC connection reconfiguration procedure, or the like.

Alternatively, the information representing the possession of the establishment information related to the suspended cell associated with the second BS may be repeatedly transmitted until the first BS takes back cell information associated with the second BS, during a predetermined time period after the occurrence of the RLF.

5. The first BS, which has received the representation information representing the possession of the establishment information related to the suspended cell associated with the second BS, transmits, to the UE, a message which requests establishment information related to a cell associated with the second BS.

6. The UE transmits, to the BS, the establishment information related to the suspended cell associated with the second BS.

As described above with reference to FIG. 8, the establishment information related to the suspended cell associated with the second BS may include establishment of a radio bearer for each cell, SCellToAddModList, RadioResource- ConfigCommonSCell, RadioResourceConfigDedicatedS-Cell, SCellToReleaseList, and the like.

Specifically, the establishment information related to the suspended cell associated with the second BS may include RadioResourceConfigCommonSCell, RadioResourceConfigDedicatedSCell, SCellToReleaseList, and information related to the establishment of a radio bearer.

Here, a SCell is described as an example of a cell associated with the second BS, and each information element may be represented as an information element representing the second BS (e.g., an SeNB) instead of the SCell.

7. The BS configures cell establishment information associated with the second BS of the UE on the basis of the establishment information related to the cell associated with the second BS, which has been received from the relevant UE, and transmits the configured cell establishment information to the UE. The cell establishment information associated with the second BS, which is transmitted to the UE, may be identical to or different from the information which has been received from the UE.

The first BS may exchange information for a dual connectivity of the relevant UE, with the second BS on the basis of the configured cell establishment information associated with the second BS of the UE.

8. The UE, which has received the cell establishment information associated with the second BS from the BS, re-establishes a cell associated with the second BS, according to the relevant information.

9. The BS transmits an activation request message to the relevant UE. The BS may also deliver, to the second BS, a message indicating that the second BS resumes communication with the relevant UE.

10. The second BS resumes the communication with the UE.

Embodiment 2-1: Another Method for Processing an RLF when a Cell Associated with a Second BS is Performing Normal Communication and the RLF is Detected in a Cell Associated with a First BS FIG. 9 is a diagram exemplary illustrating operations of a UE and BSs in a case where an RLF occurs in a cell associated with a first BS according to another embodiment of the present disclosure.

When a detected cell having a RLF is a cell associated with the first BS, the UE may transmit, to the second BS, an RLF-related signal including at least one piece of information among information indicating the occurrence of the RLF in the cell associated with the first BS, RLF cause information, and index information indicating a cell having the RLF in accordance with another embodiment.

Also, as establishment information for processing the RLF which is received from the second BS, the UE may include one piece of information among information for an RRC connection with the second BS, information for reconfiguring the RRC connection with the second BS, information for re-establishing the RRC connection with the second BS, and information for performing a handover to the second BS in accordance with another embodiment.

Figure 9:
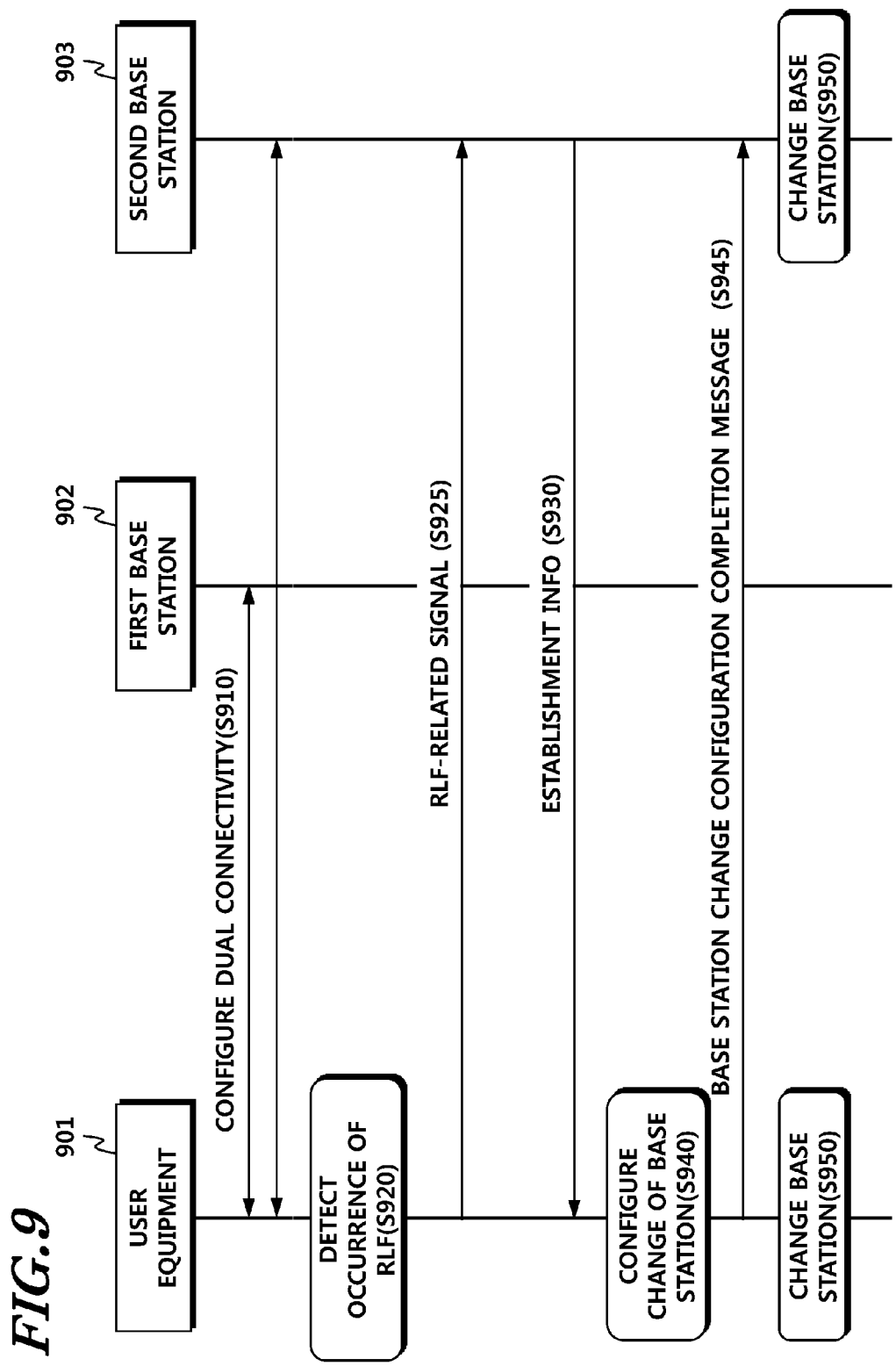
FIG. 9 is a diagram illustrating operations of a user equipment and base stations when an RLF occurs in a cell associated with a first base station according to another embodiment of the present disclosure.

Referring to FIG. 9, in step S910, the UE 901 configures a dual connectivity with the first BS 902 and the second BS 903.

As described above, when an RLF occurs in a cell associated with the first BS, in step S920, the UE 901 detects the occurrence of the RLF.

As described above, the occurrence of the RLF in the cell associated with the first BS may be detected when out-of-synchronization occurs (more than the predetermined number of times) in a physical layer, when a random access problem occurs in an MAC layer, or when the maximum number of times of retransmission is reached in an RLC layer.

When a detected cell having the RLF is the cell associated with the first BS, in step S925, the UE 901 transmits, to the second BS 903, an RLF-related signal including information indicating the occurrence of the RLF.

The RLF-related signal may include at least one piece of information among information indicating the occurrence of the RLF in the cell associated with the first BS, RLF cause information, and index information indicating a cell in which the RLF occurs.

Alternatively, the first BS 902 may deliver, to the second BS 903, information on the occurrence of the RLF and context information of the UE 901.

In step S930, the second BS 903 transmits, to the UE 901, establishment information including information required to change the second BS 903 to a master BS with respect to the relevant UE 901 on the basis of the information received from the UE 901 or the first BS 902.

The UE 901 applies a configuration for changing a BS on the basis of the received establishment information in step S940, and transmits a BS change configuration completion message to the second BS 903 in step S945.

Accordingly, the second BS 903 may serve as the first BS 902 with respect to the relevant UE 901. As an example, the second BS 903 may provide a cell which becomes a reference of a handover and may serve as a mobility anchor in a core network.

Hereinafter, the method for processing an RLF, according to embodiment 2-1 of the present disclosure will be described in more detail.

1. The UE performs physical layer monitoring on each of a cell associated with the first BS and a cell associated with the second BS.

2. When a synchronization problem (e.g., out-of-synchronization) occurs in a physical layer of a cell operating as a PCell among cells associated with the first BS, the UE declares an RLF for the PCell, in which the synchronization problem has occurred among the cells associated with the first BS.

As another example of detecting the occurrence of an RLF, when out-of-synchronization indications are delivered from a physical layer more than or equal to a predetermined threshold value, an RRC layer of the UE may declare an RLF. Alternatively, when random access problem indication is delivered from an MAC layer, the RRC layer of the UE may declare an RLF. Alternatively, when the maximum number of times of retransmission is reached in an RLC layer, the RRC layer of the UE may declare an RLF.

3. When the RLF has occurred in the cell associated with the first BS, the UE reports, to the second BS, the RLF in the cell associated with the first BS.

The UE transmits an RLF-related signal including information indicating the occurrence of the RLF in the cell associated with the first BS. Alternatively, the first BS may deliver, to the second BS, information on the RLF in the cell associated with the first BS of the relevant UE, and context information of the relevant UE.

4. The second BS transmits, to the relevant UE, establishment information including configuration information for changing the second BS to a master BS with respect to the relevant UE on the basis of the information received from the UE or the previous first BS. The above-described configuration information may be transmitted through higher layer signaling, and may be, for example, RRC connection reconfiguration message.

5. The UE allows the second BS to be configured to be changed to a master BS, according to the received establishment information. Here, the change of the second BS to the first BS implies that the second BS performs the above-described role of the first BS as the master BS.

Embodiment 2-2: Another Method for Processing an RLF when a Cell Associated with a Second BS is Performing Normal Communication and the RLF is Detected in a Cell Associated with a First BS FIG. 10 is a diagram illustrating operations of a UE and BSs when an RLF occurs in a cell associated with a first BS according to still another embodiment of the present disclosure.

When a detected cell having the RLF is a cell associated with the first BS, the UE transmits, to the second BS, an RLF-related signal including information which requests the re-establishment of an RRC connection with the second BS in accordance with still another embodiment.

Also, establishment information for processing an RLF, which is received from the second BS, may include information for re-establishing an RRC connection with the second BS in accordance with still another embodiment.

Figure 10:
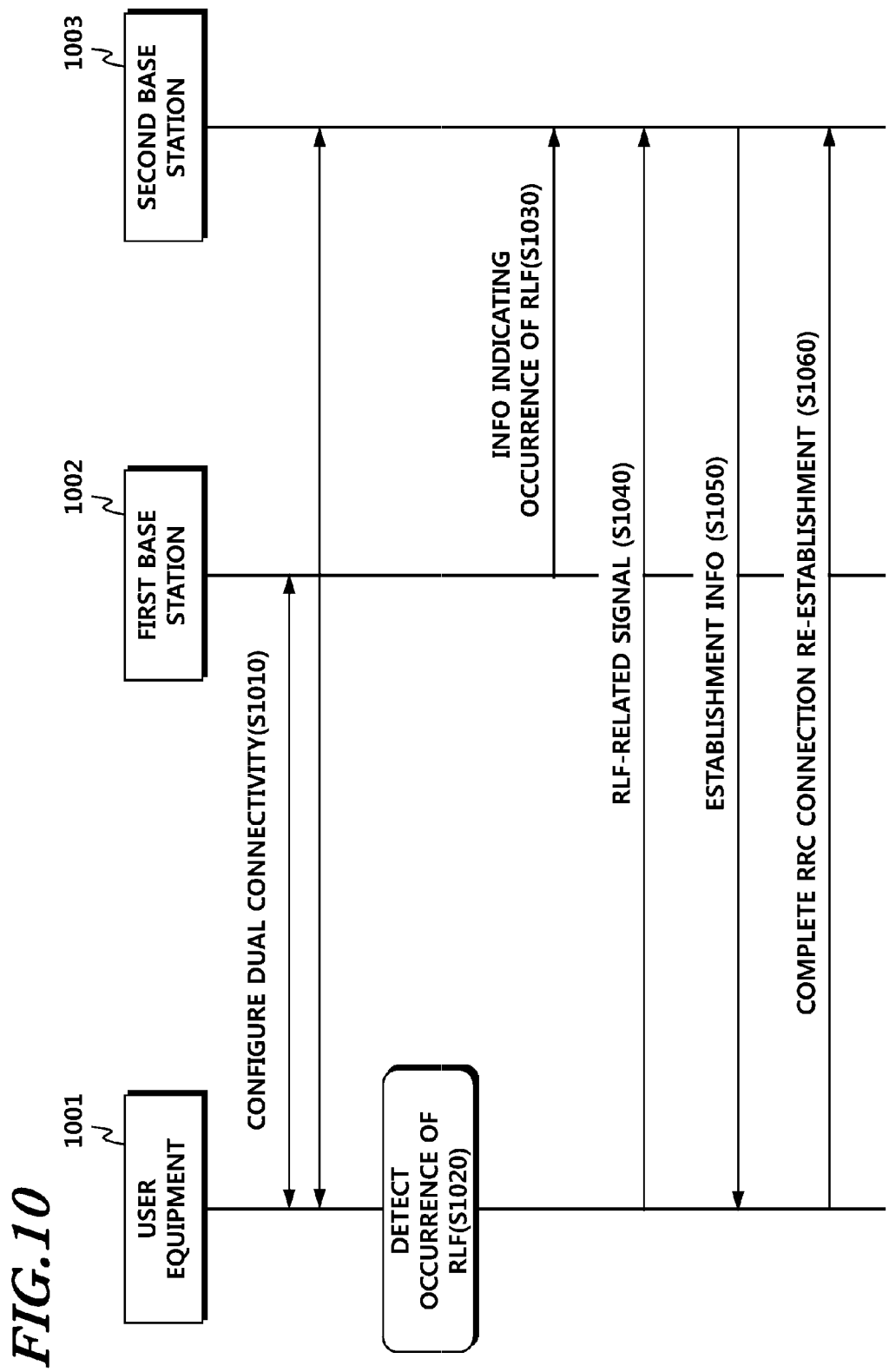
FIG. 10 is a diagram illustrating operations of a user equipment and base stations when an RLF occurs in a cell associated with a first base station according to still another embodiment of the present invention.

Referring to FIG. 10, in step S1010, the UE 1001 configures a dual connectivity with the first BS 1002 and the second BS 1003.

In step S1020, as described above, when an RLF occurs in a cell associated with the first BS, the UE 1001 detects the occurrence of the RLF.

As described above, the occurrence of the RLF in the cell associated with the first BS may be detected when out-of-synchronization occurs (more than the predetermined number of times) in a physical layer, when a random access problem occurs in an MAC layer, or when the maximum number of times of retransmission is reached in an RLC layer.

When the RLF has occurred, in step S1030, the first BS 1002 transmits, to the second BS 1003, a signal including information indicating the occurrence of the RLF and context information of the UE 1001.

In step S1040, the UE 1001 transmits, to the second BS 1003, an RLF-related signal including information which requests RRC connection re-establishment.

As an example, the RLF-related signal may be transmitted through higher layer signaling. For example, the higher layer signaling may be an RRC connection re-establishment request message or may be a newly-defined RRC message. As an example, when the higher layer signaling is an RRC connection re-establishment request message, ReestablishmentCause may be set to MeNBFailure. The second BS 1003 may receive the relevant signal and may perform an RRC connection re-establishment procedure between the second BS 1003 and the UE 1001.

Also, the second BS 1003 may send, to the first BS 1002, a request for context information of the UE 1001, establishment information, and the like, and may receive the context information of the UE 1001, the establishment information, and the like.

In step S1050, the second BS 1003 transmits, to the UE 1001, establishment information including configuration information for changing to a master BS with respect to the relevant UE 1001 on the basis of the information received from the UE 1001 or the first BS 1002. As an example, the establishment information may be included in higher layer signaling and the higher layer signaling including the establishment information may be transmitted. The higher layer signaling may be, for example, an RRC connection re-establishment message.

In step S1060, the UE 1001 applies a configuration for changing a BS on the basis of the received establishment information and transmits a BS change configuration completion message to the second BS 1003. As an example, the BS change configuration completion message may be an RRC connection re-establishment completion message.

Through the above-described RRC connection re-establishment procedure, the second BS 1003 and the UE 1001 may form an RRC connection therebetween, and the second BS 1003 may be configured as a master BS with respect to the relevant UE 1001. Specifically, the second BS 1003 may provide a cell, which becomes a reference of a handover, to the relevant UE 1001, and may serve as a mobility anchor in a core network.

Third Embodiment: a Method for Processing RLFs when an RLF is Detected (is Being Repaired) in a Cell Associated with a First BS (or a Cell Associated with a Second BS) and, Successively, Another RLF is Immediately Detected in the Cell Associated with the Second BS (or the Cell Associated with the First BS)

Figure 11:
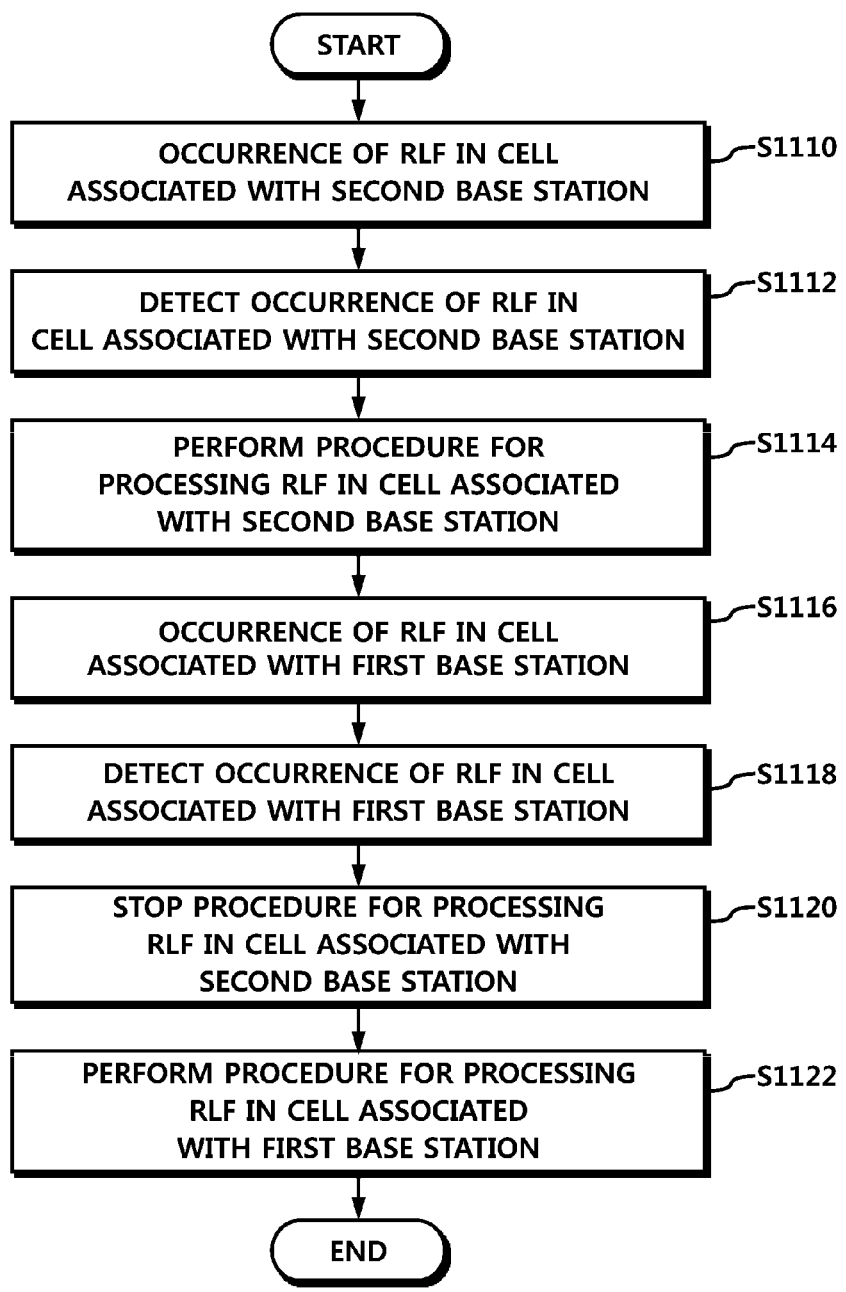
FIG. 11 is a flowchart illustrating operations of a user equipment for detecting respective RLFs in cells associated with a first base station and a second base station according to an embodiment of the present disclosure.

FIG. 11 is a flowchart exemplary illustrating operations of a UE for detecting respective RLFs in cells associated with a first BS and a second BS according to an embodiment of the present disclosure.

When occurrences of RLFs in cells associated with the first BS and the second BS are simultaneously or sequentially detected, the UE may first process the RLF in the cell associated with the first BS before processing the RLF in the cell associated with the second BS in accordance with at least one embodiment.

A method for processing an RLF occurring in a cell associated with the second BS and another RLF occurring in the cell associated with the first BS will be described with reference to FIG. 11.

When an RLF occurs in a cell associated with the second BS in step S1110, the UE detects the occurrence of the RLF in step S1112. Thereafter, in step S1114, the UE may perform a procedure for processing the RLF in the cell associated with the second BS, as described above.

When an RLF occurs and the occurrence of the RLF is detected in a cell associated with the first BS in steps S1116 and S1118 while the UE performs step S1114, in step S1120, the UE stops the execution of the procedure for processing the RLF in the cell associated with the second BS.

In step S1122, the UE first performs the procedure for processing the RLF in the cell associated with the first BS.

Figure 12:
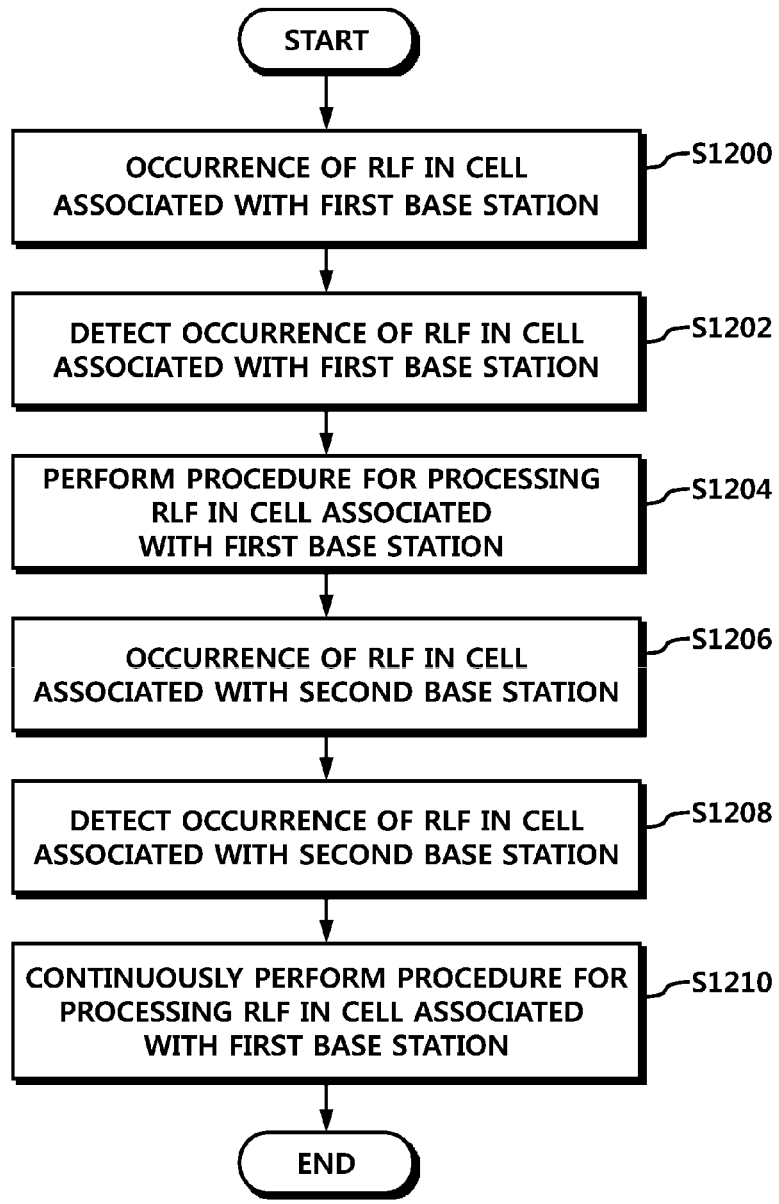
FIG. 12 is a flowchart illustrating operations of a user equipment for detecting respective RLFs in cells associated with a first base station and a second base station according to another embodiment of the present disclosure.

FIG. 12 is a flowchart exemplary illustrating operations of a UE for detecting respective RLFs in cells associated with a first BS and a second BS according to another embodiment of the present disclosure.

For example, FIG. 12 illustrates a method of processing a RLF when an RLF occurs in a cell associated with the first BS and another RLF occurs in a cell associated with the second BS.

Referring to FIG. 12, when an RLF occurs in a cell associated with the first BS in step S1200, the UE detects the occurrence of the RLF in step S1202. Thereafter, in step S1204, the UE may perform a procedure for processing the RLF in the cell associated with the first BS, as described above.

However, when an RLF occurs and the occurrence of the RLF is detected in a cell associated with the second BS in steps S1206 and S1208 while the UE performs step S1204, the UE does not stop the execution of the procedure for processing the RLF in the cell associated with the first BS, but continuously performs the procedure in step S1210.

In this case, a procedure for processing the RLF in the cell associated with the second BS may be performed after completion of the procedure for processing the RLF in the cell associated with the first BS.

In other words, the detection and processing of the RLF in the cell associated with the first BS are first performed before the detection and processing of the RLF in the cell associated with the second BS.

Specifically, when an RLF is also detected in a cell associated with the second BS while the RLF is detected in the cell associated with the first BS and an RLF processing procedure (recovery procedure) is performed, a procedure (recovery procedure) for processing the RLF in the cell associated with the second BS is not performed.

In contrast, when an RLF is also detected in a cell associated with the first BS while the RLF is detected in the cell associated with the second BS and an RLF processing procedure (recovery procedure) is performed, the procedure (recovery procedure) for processing the RLF in the cell associated with the second BS, which is being performed, is stopped, and a procedure (recovery procedure) for processing the RLF in the cell associated with the first BS is performed.

When RLFs are simultaneously detected in a cell associated with the first BS and a cell associated with the second BS, an operation for detecting and processing the RLF in the cell associated with the first BS is first performed.

Hereinafter, an operation of the UE including each of the above-described embodiments will be described with reference to the accompanying drawings.

Figure 13:
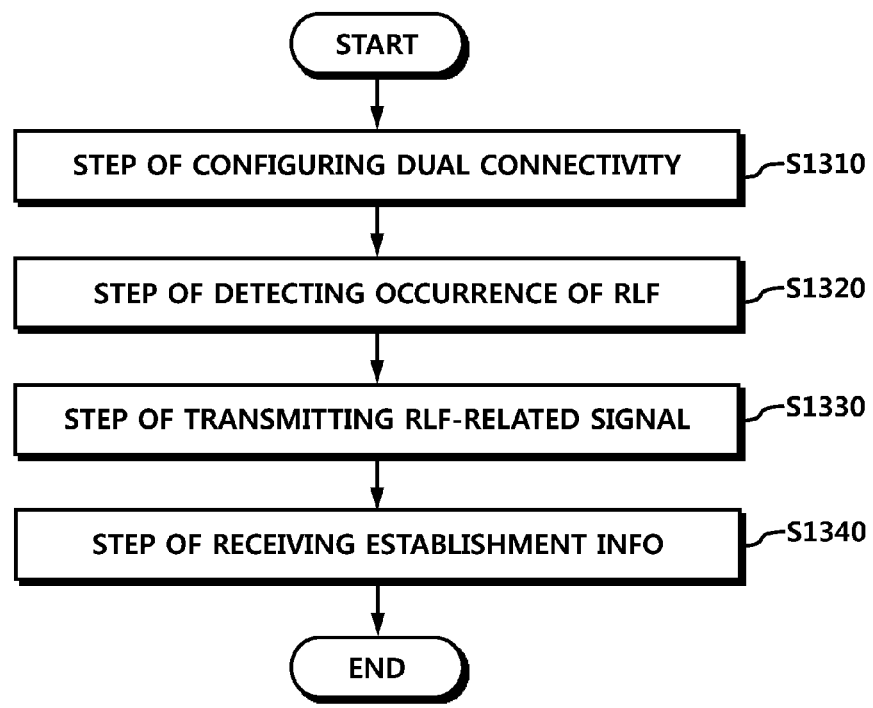
FIG. 13 is a flowchart illustrating an operation of a user equipment according to another embodiment of the present disclosure.

FIG. 13 is a flowchart illustrating an operation of a UE according to an embodiment of the present disclosure.

In step S1310, the UE may configure a dual connectivity with the first BS and the second BS and may perform communication on at least one cell associated with the first BS and at least one cell associated with the second BS in accordance with an embodiment.

In step S1320, the UE detects the occurrence of an RLF in a cell associated with each of the first BS and the second BS.

When the occurrence of the RLF is detected, the UE transmits an RLF-related signal to one of the first BS and the second BS in step S1330.

In this case, as described above, according to each embodiment of the present disclosure, the transmitted RLF-related signal may include information representing the occurrence of the RLF in the cell associated with the second BS (First embodiment), or may include suspend indication information on a cell associated with the second BS (Second embodiment).

Alternatively, the transmitted RLF-related signal may include information representing the occurrence of the RLF in the cell associated with the first BS (embodiment 2-1).

Alternatively, the transmitted RLF-related signal may include information which requests the re-establishment of an RRC connection with the second BS (embodiment 2-2).

Alternatively, the second embodiment of the present invention may further include a step of performing a procedure for re-establishing the cell associated with the first BS in which the RLF has occurred, after the step of transmitting the RLF-related signal.

Thereafter, the UE includes a step of receiving cell establishment information associated with the second BS from the first BS which is accessed (or re-established).

Even in this case, as described above, the cell establishment information associated with the second BS may be the existing cell establishment information associated with the second BS, or may include information of a changed new cell associated with the second BS.

Alternatively, the first embodiment of the present disclosure may release the cell associated with the second BS in which the RLF has occurred, and may include information which allows a change of a radio bearer of a cell associated with the second BS to a cell associated with the first BS.

Thereafter, the UE may re-establish a cell associated with the second BS on the basis of the cell establishment information associated with the second BS and may start communication with a cell associated with the second BS on receiving an activation request message from the first BS.

In embodiment 2-1, when a detected cell having the RLF is a cell associated with the first BS, the UE transmits, to the second BS, an RLF-related signal including information indicating the occurrence of the RLF in step S1330.

Thereafter, in step S1340, the UE receives, from the second BS, establishment information including configuration information for configuring the second BS as a master BS.

The UE receives the establishment information and applies a configuration for changing the second BS to a master BS, and the second BS is changed to the master BS. Here, the change of the second BS to the master BS implies that the second BS is configured to perform a particular function that the previous first BS has performed, as described above. Specifically, the second BS serves as a mobility anchor in a core network, and performs a handover procedure when a cell associated with the second BS is changed.

Hereinafter, operations of the first BS and the second BS according to each embodiment of the present disclosure will be described.

Figure 14:
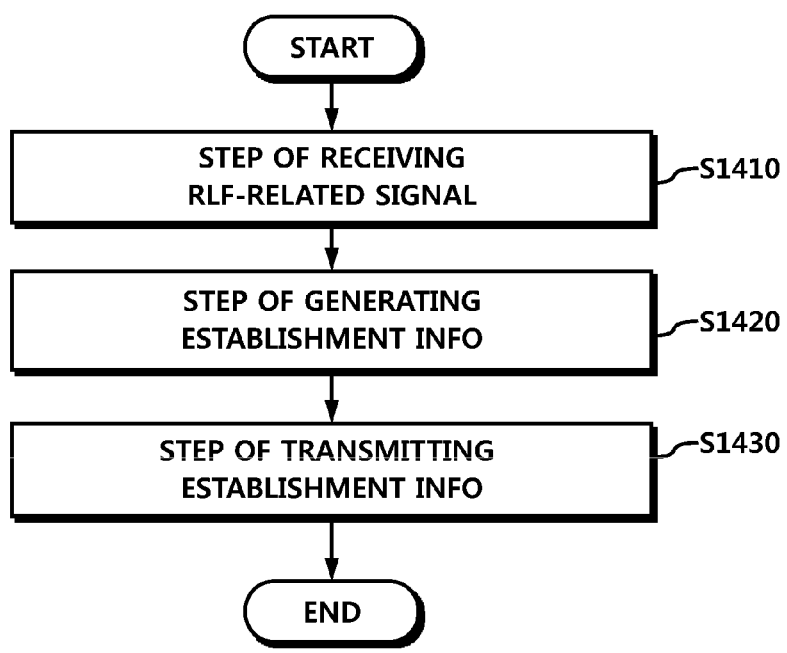
FIG. 14 is a flowchart illustrating an operation of a first base station according to an embodiment of the present disclosure.

FIG. 14 is a flowchart illustrating an operation of a first BS according to an embodiment of the present disclosure.

In accordance with at least one embodiment, a method of a first BS for controlling processing of an RLF, the method includes: receiving an RLF-related signal from the UE or a second BS providing additional radio resources to the UE; generating establishment information for processing the RLF; and transmitting the establishment information for processing the RLF.

Referring to FIG. 14, the first BS and the second BS may provide, together, at least one cell to the UE and may configure a dual connectivity with respect to the UE.

In this case, the UE may serve as the above-described master BS.

In step S1410, the first BS receives, from the UE, an RLF-related signal including information indicating the occurrence of an RLF in a cell associated with the second BS. The RLF-related signal may be received through higher layer signaling.

Also, the first BS may receive, from the second BS, an occurrence report including information representing the occurrence of the RLF in the cell associated with the second BS.

The RLF-related signal and the occurrence report from the second BS may be generated at the same time or only the RLF-related signal may be received. The above-described occurrence reports may be transmitted and received through an interface configured between the first BS and the second BS.

When the RLF-related signal is received from the UE, the first BS may change establishment information of a cell associated with the second BS, and thereby may generate new establishment information in step S1420.

Also, the first BS may exchange, with the second BS, the changed/existing establishment information of the cell associated with the second BS so that the UE can perform multiple access with a cell associated with the first BS and a cell associated with the second BS. In this case, information may also be exchanged through an interface between the BSs.

In step S1430, the first BS transmits, to the UE, establishment information for processing the RLF in the cell associated with the second BS.

For example, after the first BS receives, from the UE, the RLF-related signal including information indicating the occurrence of the RLF in the cell associated with the second BS, the first BS transmits, to the UE, the establishment information for re-establishing a cell associated with the second BS or changing to a new cell, which has been received from the first BS.

The establishment information, according to an embodiment of the present disclosure, may include one piece of information among re-establishment information of the cell associated with the second BS in which the RLF has occurred, change information of a cell associated with the second BS, and information for releasing the cell associated with the second BS in which the RLF has occurred and changing a radio bearer to a cell associated with the first BS.

Also, after the first BS transmits the establishment information on the cell associated with the second BS, a step may be further included in which, when the UE configures a cell associated with the second BS, the first BS transmits, to the UE or the second BS that the UE is to access, information which requests activation for accessing by the UE.

When an RLF-related signal includes representation information representing the possession of related establishment information on the suspended cell associated with the second BS, the first BS according to another embodiment of the present disclosure may further include a step of transmitting a signal which requests the related establishment information on the suspended cell associated with the second BS (in the second embodiment).

Figure 15:
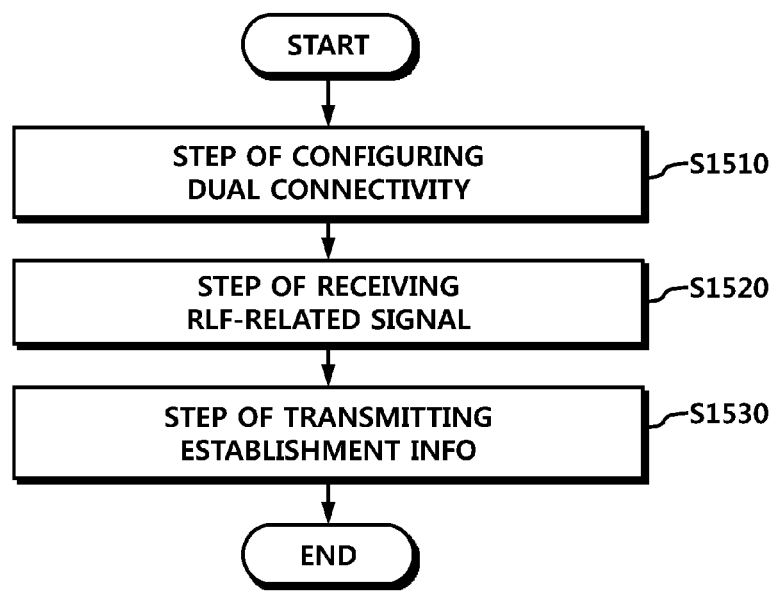
FIG. 15 is a flowchart illustrating an operation of a second base station according to an embodiment of the present disclosure.

FIG. 15 is a flowchart illustrating an operation of a second BS according to an embodiment of the present disclosure.

In accordance with at least one embodiment, a method of a second BS for controlling processing of an RLF may include: configuring a dual connectivity with respect to the UE, by the second BS together with a first BS providing radio resources to the UE; and receiving, from the UE or the first BS, an RLF-related signal including one piece of information among information indicating the occurrence of an RLF in a cell associated with the first BS and suspend indication information of a cell associated with the second BS.

Also, when the RLF-related signal includes the information indicating the occurrence of the RLF in the cell associated with the first BS, the second BS according to another embodiment of the present disclosure may further include a step of transmitting, to the UE, establishment information for processing the RLF which includes one piece of information among information for an RRC connection with the UE, information for reconfiguring the RRC connection with the UE, information for re-establishing the RRC connection with the UE, and information for performing a handover of the UE.

Also, when the RLF-related signal includes the information indicating the occurrence of the RLF in the cell associated with the first BS, the second BS according to another embodiment of the present disclosure may further include a step of performing a procedure for re-establishing the RRC connection with the UE.

Referring to FIG. 15, in step S1510, the second BS and the first BS may provide, together, additional radio resources to the UE and may configure a dual connectivity with respect to the UE.

Thereafter, in step S1520, the second BS receives, from the UE, the RLF-related signal including at least one piece of information among the information indicating the occurrence of the RLF in the cell associated with the first BS and suspend indication information on a cell associated with the second BS.

When the RLF has occurred in the cell associated with the first BS as in the above-described second embodiment, embodiment 2-1, or embodiment 2-2, the second BS receives the RLF-related signal, and in this case, information included in the RLF-related signal may be different for each embodiment, as described above.

First, in the above-described second embodiment, the second BS may receive an RLF-related signal including suspend indication information.

In this case, the second BS suspends communication of a cell associated with the second BS on the basis of the RLF-related signal.

Thereafter, after the RLF in the cell associated with the first BS is processed, the second BS may resume communication according to an operation of the UE.

When the RLF-related signal includes the information indicating the occurrence of the RLF in the cell associated with the first BS as in embodiment 2-1, the second BS may transmit establishment information including configuration information required to change a BS in step S1530.

Thereafter, the UE changes the second BS to a master BS on the basis of the establishment information, the second BS receives a BS change completion message, and thereby the change of a BS is completed.

When an RLF-related signal includes RRC connection re-establishment request information of the UE as in embodiment 2-2, the second BS performs a procedure for re-establishing an RRC connection with the UE.

In this case, the establishment information may include information for RRC connection re-establishment, as described above.

In the third embodiment, the first BS and the second BS perform the above-described procedure and perform an operation required to first process the occurrence of an RLF in a cell associated with the first BS.

Hereinafter, configurations of a UE and a BS, which perform all of the operations according to the above-described respective embodiments of the present disclosure, will be briefly described again.

Figure 16:
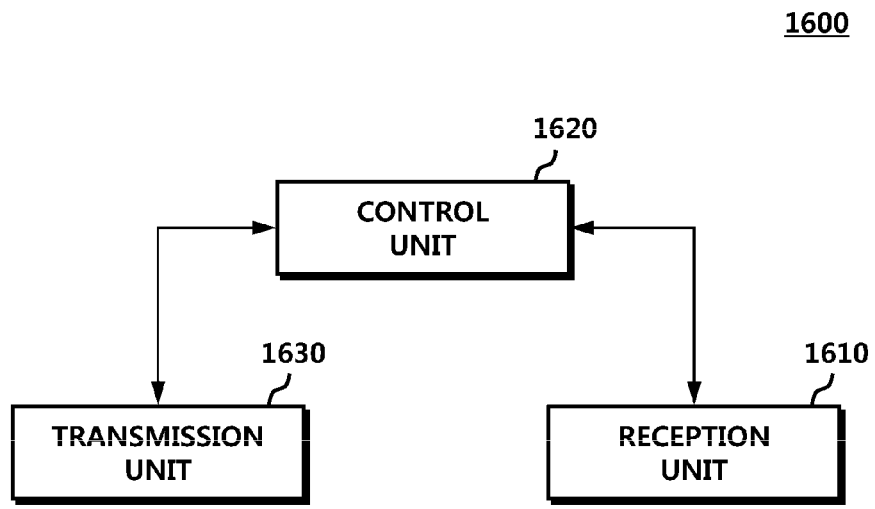
FIG. 16 is a block diagram illustrating a configuration of a user equipment according to an embodiment of the present disclosure.

FIG. 16 is a block diagram illustrating a configuration of a UE according to an embodiment of the present disclosure.

Referring to FIG. 16, in accordance with at least one embodiment, a UE 1600 for processing an RLF includes: a control unit 1620 for configuring a dual connectivity with at least one cell associated with a first BS and at least one cell associated with a second BS; the control unit 1620 for detecting the occurrence of the RLF in at least one of the at least one cell associated with the first BS and the at least one cell associated with the second BS; a transmission unit 1630 for transmitting an RLF-related signal to the first BS or the second BS; and a reception unit 1610 for receiving establishment information for processing the RLF.

Also, when a detected cell having the RLF is a cell associated with the second BS, the transmission unit 1630, according to another embodiment of the present invention, may transmit, to the first BS, an RLF-related signal including at least one piece of information among information indicating the occurrence of the RLF in the cell associated with the second BS, RLF cause information, index information, and index information indicating a cell in which the RLF occurs.

In another embodiment of the present disclosure, when a detected cell having the RLF is a cell associated with the first BS, the transmission unit 1630 may transmit, to the second BS, an RLF-related signal including suspend indication information of a cell associated with the second BS.

In another embodiment of the present disclosure, the transmission unit 1630 may further transmit, to a target BS for RRC re-establishment, representation information representing the possession of related establishment information on the suspended cell associated with the second BS, and may receive request information from the target BS and may further transmit the related establishment information on the suspended cell associated with the second BS.

In another embodiment of the present disclosure, when a detected cell having the RLF is a cell associated with the first BS, the transmission unit 1630 may transmit, to the second BS, an RLF-related signal including at least one piece of information among information indicating the occurrence of the RLF in the cell associated with the first BS, RLF cause information, and index information indicating a cell in which the RLF occurs.

In another embodiment of the present disclosure, when a detected cell having the RLF is a cell associated with the first BS, the transmission unit 1630 may transmit, to the second BS, an RLF-related signal including information which requests the re-establishment of an RRC connection with the second BS.

In another embodiment of the present disclosure, when occurrences of RLFs are simultaneously or sequentially detected in a cell associated with the first BS and a cell associated with the second BS, the control unit 1620 may first process the RLF in the cell associated with the first BS before processing the RLF in the cell associated with the second BS.

In addition, the transmission unit 1630 may transmit data, a message, and information to the first BS and the second BS, and the reception unit 1610 may receive, from the first BS and the second BS, data, a message, and the like including the above-described information.

According to the above-described respective embodiments of the present disclosure, the control unit 1620 may control an overall operation of the UE which is required to detect and process an RLF.

Figure 17:
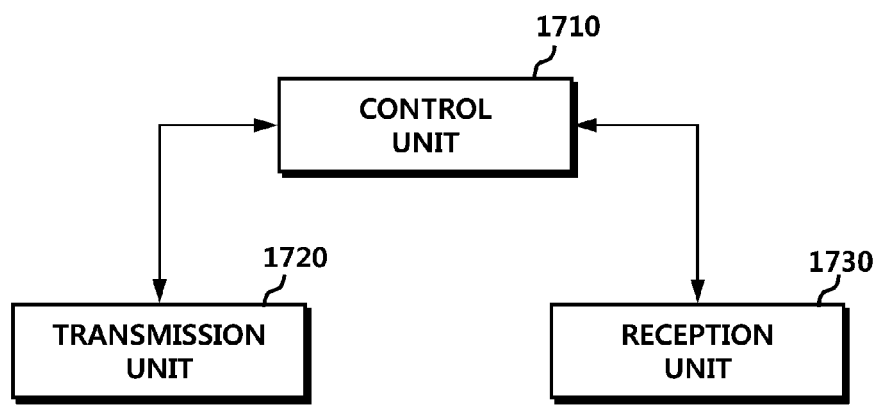
FIG. 17 is a block diagram illustrating a configuration of each of a first base station and a second base station according to an embodiment of the present disclosure.

FIG. 17 is a block diagram illustrating a configuration of each of a first BS and a second BS according to an embodiment of the present disclosure.

According to an embodiment of the present disclosure, a first BS may include: a reception unit 1730 for receiving an RLF-related signal from a UE or a second BS providing additional radio resources to the UE; a control unit for generating establishment information for processing an RLF; and a transmission unit 1720 for transmitting the establishment information for processing the RLF.

When the RLF-related signal includes at least one piece of information among information indicating the occurrence of an RLF in a cell associated with the second BS, RLF cause information, and index information on a cell in which the RLF occurs, the above-described establishment information may include one piece of information among re-establishment information of the cell associated with the second BS in which the RLF has occurred, change information of a cell associated with the second BS, and information for releasing the cell associated with the second BS in which the RLF has occurred and changing a radio bearer to a cell associated with the first BS.

Also, the control unit 1710 controls an overall operation of the first BS which is required to process respective RLFs, according to occurrences of the RLFs in a cell associated with the second BS and a cell associated with the first BS which are required to perform the above-described present invention.

The transmission unit 1720 and the reception unit 1730 are used to transmit and receive a signal, a message, and data, which are required to perform the above-described present invention, to/from the UE and the second BS.

For example, the control unit 1710 controls an operation of the first BS required, together with the second BS providing additional radio resources to the UE, to form a dual connectivity with respect to the UE. Also, the control unit 1710 may generate establishment information for processing an RLF in a cell associated with the second BS.

The transmission unit 1720 may transmit, to the UE, the establishment information for processing the RLF in the cell associated with the second BS.

The reception unit 1730 may receive, from the UE, an RLF-related signal including information indicating the occurrence of the RLF in the cell associated with the second BS.

Referring again to FIG. 17, elements of the second BS will be described.

A second BS, according to an embodiment of the present disclosure, may include: a control unit 1710 for configuring a dual connectivity with respect to a UE, wherein the control unit 1710 and a first BS providing radio resources to the UE configure the dual connectivity together; and a reception unit 1730 for receiving, from the UE or the first BS, an RLF-related signal including one piece of information among information indicating the occurrence of an RLF in a cell associated with the first BS and suspend indication information of a cell associated with the second BS.

Also, when the RLF-related signal includes the information indicating the occurrence of the RLF in the cell associated with the first BS, the second BS of the present invention may further include a transmission unit 1720 for transmitting, to the UE, establishment information for processing an RLF which includes one piece of information among information for an RRC connection with the UE, information for reconfiguring the RRC connection with the UE, information for re-establishing the RRC connection with the UE, and information for performing a handover of the UE.

In an embodiment of the present disclosure, when the RLF-related signal includes the information indicating the occurrence of the RLF in the cell associated with the first BS, the control unit 1710 performs a procedure for re-establishing the RRC connection with the UE.

Also, the control unit 1710 controls an overall operation of the second BS which is required to process respective RLFs, according to occurrences of the RLFs in a cell associated with the second BS and a cell associated with the first BS which are required to perform the above-described present disclosure.

The transmission unit 1720 and the reception unit 1730 are used to transmit and receive a signal, a message, and data, which are required to perform the above-described present disclosure, to/from the UE and the first BS.

For example, the control unit 1710 controls an operation of the second BS required, together with the first BS providing radio resources to the UE, to form a dual connectivity with respect to the UE.

Also, the control unit 1710 may generate a BS change signal for processing an RLF in a cell associated with the first BS, and may change a BS.

When information indicating the occurrence of the RLF in the cell associated with the first BS is included, the transmission unit 1720 may transmit establishment information including information for changing the second BS to a master BS.

As described hereinabove, the occurrence of an RLF in each of a cell associated with the first BS and a cell associated with the second BS is advantageously detected in an environment where the UE forms a dual connectivity with at least two BSs in accordance with at least one embodiment.

Also, when the RLF is detected, the RLF is rapidly repaired according to a BS associated with the cell having the RLF in accordance with at least one embodiment.

Further, when an RLF occurs in a cell associated with any one BS in the dual connectivity environment, data can be processed through another BS in accordance with at least one embodiment.

The above description is only an illustrative description of the technical idea of the present invention, and those having ordinary knowledge in the technical field, to which the present invention pertains, will appreciate that various modifications and changes in form are possible without departing from the essential features of the present invention. Therefore, the embodiments disclosed in the present invention are intended not to limit but to describe the technical idea of the present invention, and thus do not limit the scope of the technical idea of the present invention. The protection scope of the present invention should be construed based on the appended claims, and all of the technical ideas included within the scope equivalent to the appended claims should be construed as being included within the right scope of the present invention.

The invention claimed is:

1. A method for processing a Radio Link Failure (RLF) by a User Equipment (UE), the method comprising:
   configuring a dual connectivity with at least one cell associated with a first Base Station (BS) and at least one cell associated with a second BS;
   detecting occurrence of an RLF for at least one of the at least one cell associated with the first BS and the at least one cell associated with the second BS; and
   transmitting an RLF-related signal to a BS where the RLF does not occur, among the first BS and the second BS, wherein the RLF-related signal includes information indicating the occurrence of the RLF.

2. The method as claimed in claim 1, wherein, when a detected cell having the RLF is the cell associated with the second BS, the RLF-related signal is transmitted to the first BS, where the RLF-related signal includes at least one piece of information among information indicating the occurrence of the RLF in the cell associated with the second BS, RLF cause information, and index information indicating a cell in which the RLF occurs.

3. The method as claimed in claim 1, wherein, when a detected cell having the RLF is the cell associated with the first BS, the RLF-related signal includes suspend indication information of the cell associated with the second BS.

4. The method as claimed in claim 3, further comprising after the transmitting of the RLF-related signal:
   transmitting, to a target BS for Radio Resource Control (RRC) re-establishment, representation information representing possession of related establishment information on the suspended cell associated with the second BS; and
   receiving request information from the target BS and transmitting the related establishment information on the suspended cell associated with the second BS.

5. The method as claimed in claim 1, wherein, when a detected cell having the RLF is the cell associated with the first BS, the RLF-related signal is transmitted to the second BS, where the RLF-related signal includes at least one piece of information among information indicating the occurrence of the RLF in the cell associated with the first BS, RLF cause information, and index information indicating a cell in which the RLF occurs.

6. The method as claimed in claim 1, wherein, when a detected cell having the RLF is the cell associated with the first BS, the RLF-related signal is transmitted to the second BS, where the RLF-related signal includes information requesting re-establishment of an RRC connection with the second BS.

7. The method as claimed in claim 1, wherein, when the occurrences of the RLFs in the cell associated with the first BS and the cell associated with the second BS are simultaneously or sequentially detected, the RLF in the cell associated with the first BS is first processed before processing the RLF in the cell associated with the second BS.

8. A method of a first Base Station (BS) for controlling processing of a Radio Link Failure (RLF), the method comprising:
   receiving, by the first BS, an RLF-related signal from one of the UE and a second BS that provides additional radio resources to the UE; and
   generating establishment information for processing the RLF,
   wherein the UE transmits the RLF-related signal to the first BS when the UE detects occurrence of the RLF in at least one cell associated with the second BS; and
   wherein the RLF-related signal includes information indicating the occurrence of the RLF.

9. A User Equipment (UE) for processing a Radio Link Failure (RLF), the UE comprising:
   a control unit configured to configure a dual connectivity with at least one cell associated with a first Base Station (BS) and at least one cell associated with a second BS;
   the control unit configured to detect occurrence of a RLF in at least one of the at least one cell associated with the first BS and the at least one cell associated with the second BS; and
   a transmission unit configured to transmit an RLF-related signal to a BS where the RLF does not occur, among the first BS and the second BS, wherein the RLF-related signal includes information indicating the occurrence of the RLF.

10. The UE as claimed in claim 9, wherein, when a detected cell having the RLF is the cell associated with the second BS, the transmission unit transmits, to the first BS, the RLF-related signal including at least one piece of information among information indicating the occurrence of the RLF in the cell associated with the second B S, RLF cause information, and index information indicating a cell in which the RLF occurs.

11. The UE as claimed in claim 9, wherein, when a detected cell having the RLF is the cell associated with the first BS, the transmission unit transmits, to the second BS, the RLF-related signal including suspend indication information of the cell associated with the second BS.

12. The UE as claimed in claim 11, wherein the transmission unit further transmits, to a target BS for Radio Resource Control (RRC) re-establishment, representation information representing possession of related establishment information on the suspended cell associated with the second BS, and receives request information from the target BS and further transmits the related establishment information on the suspended cell associated with the second BS.

13. The UE as claimed in claim 9, wherein, when a detected cell having the RLF is the cell associated with the first BS, the transmission unit transmits, to the second BS, the RLF-related signal including at least one piece of information among information indicating the occurrence of the RLF in the cell associated with the first BS, RLF cause information, and index information indicating a cell in which the RLF occurs.

14. The UE as claimed in claim 9, wherein, when a detected cell having the RLF is the cell associated with the first BS, the transmission unit transmits, to the second BS, the RLF-related signal including information requesting re-establishment of an RRC connection with the second BS.

15. The UE as claimed in claim 9, wherein, when the occurrences of the RLFs in the cell associated with the first BS and the cell associated with the second BS are simultaneously or sequentially detected, the control unit first processes the RLF in the cell associated with the first BS before processing the RLF in the cell associated with the second BS.

* * * * *